United States Patent [19]
Komninos

[11] Patent Number: 6,058,076
[45] Date of Patent: May 2, 2000

[54] SIGNAL DETECTOR AND METHOD FOR DETECTING SIGNALS HAVING SELECTED FREQUENCY CHARACTERISTICS

[76] Inventor: Nikolaos I. Komninos, 7343 Rattlesnake Dr., Littleton, Colo. 80124

[21] Appl. No.: 08/986,635

[22] Filed: Dec. 8, 1997

[51] Int. Cl.[7] .................................................. H04B 1/06
[52] U.S. Cl. ................................................ 367/135
[58] Field of Search ..................... 367/135; 73/40.5 A, 73/592; 381/98

[56] References Cited

U.S. PATENT DOCUMENTS

| | | | |
|---|---|---|---|
| Re. 33,977 | 6/1992 | Goodman et al. | 73/40.5 A |
| 3,500,676 | 3/1970 | Palmer | 73/40.5 A |
| 3,592,967 | 7/1971 | Harris | 367/180 |
| 3,784,754 | 1/1974 | Hagiwara et al. | 704/211 |
| 3,978,915 | 9/1976 | Harris | 73/40.5 A |
| 4,130,734 | 12/1978 | Lee | 704/203 |
| 4,408,533 | 10/1983 | Owen et al. | |
| 4,416,145 | 11/1983 | Goodman et al. | 73/40.5 A |
| 4,430,611 | 2/1984 | Boland | 324/76.53 |
| 4,461,022 | 7/1984 | Slagley | 381/29 |
| 5,089,997 | 2/1992 | Pecukonis | 367/135 |
| 5,103,675 | 4/1992 | Komninos | 73/592 |
| 5,432,755 | 7/1995 | Komninos | 367/135 |

*Primary Examiner*—Daniel T. Pihulic
*Attorney, Agent, or Firm*—Timothy J. Martin; Michael R. Henson

[57] ABSTRACT

The present invention generally relates to procedures and apparatus for monitoring incoming signals to detect the presence of selected target signals contained within the universe of signals received. More particularly, the present invention is directed to monitoring audio signals to detect selected ultrasonic and sonic signals in an ambient environment. Thus, the present invention is even more specifically directed to leak detectors and bearing wear indicators and methods for detecting sound signals which either travel in the air or are present in solids.

27 Claims, 11 Drawing Sheets

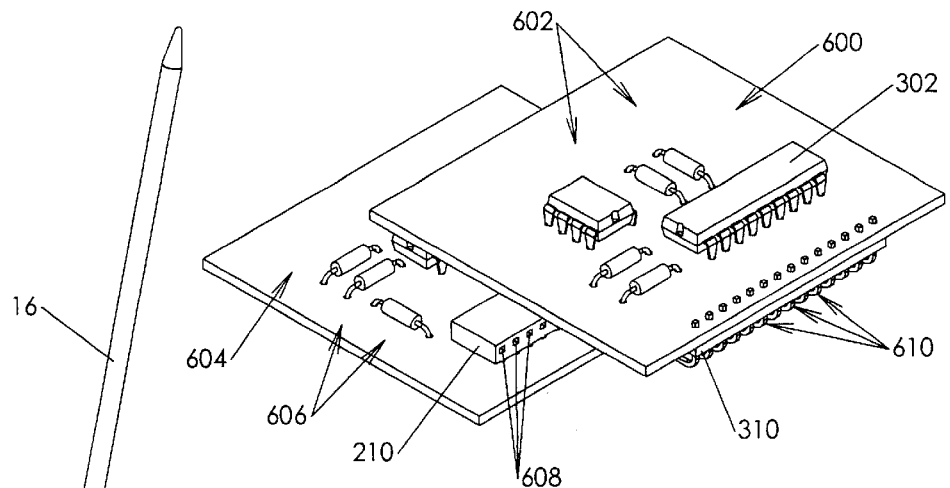
Fig. 9A
Fig. 9B
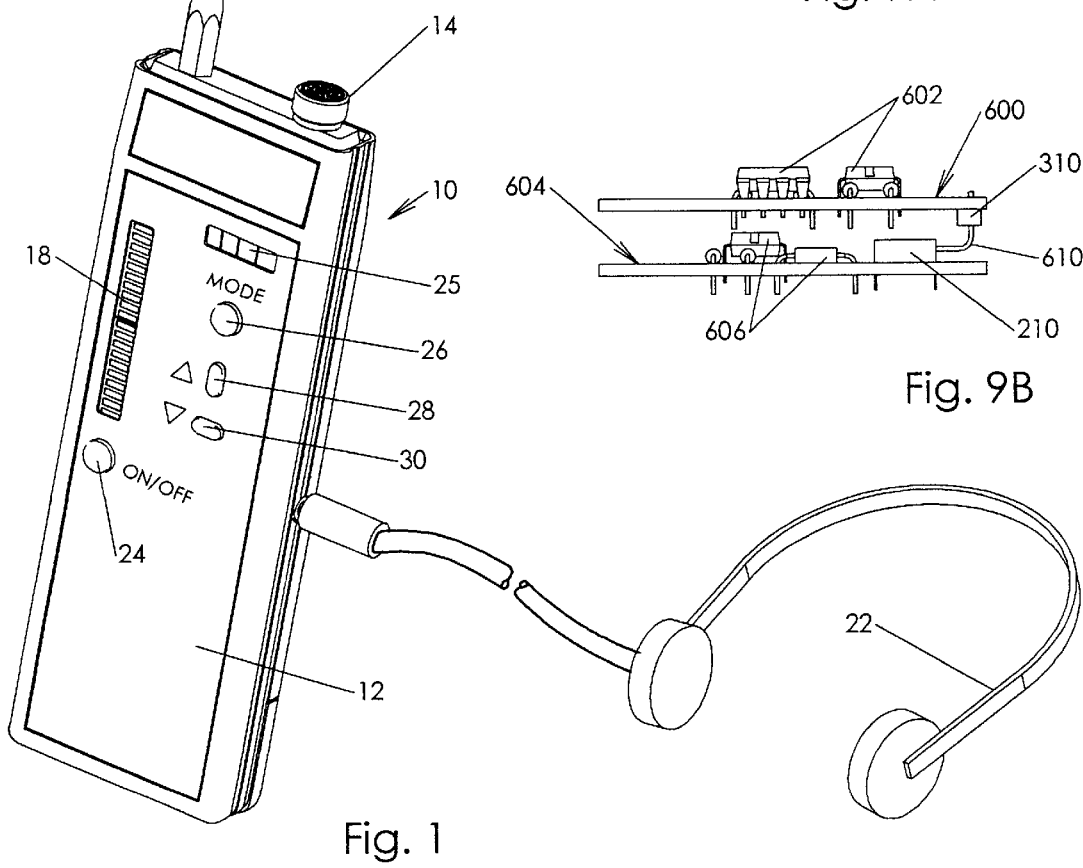
Fig. 1

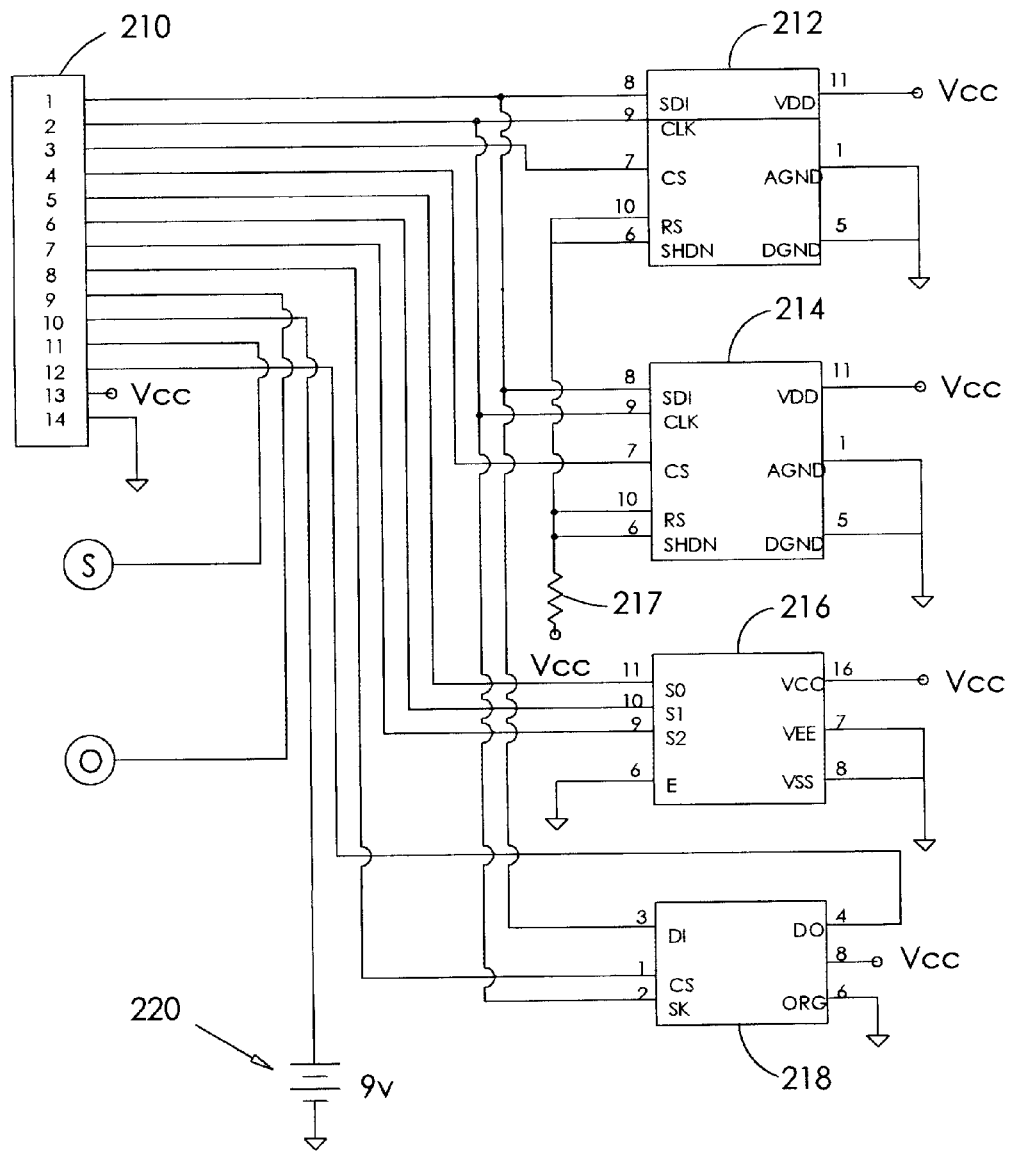
Fig. 3F
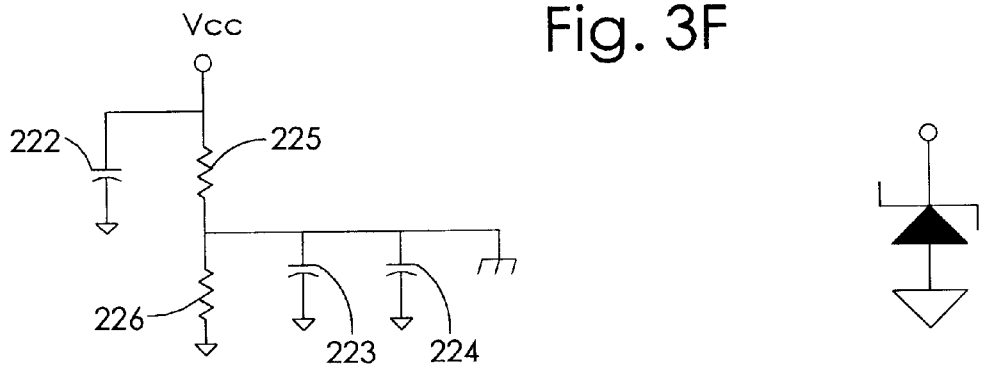
Fig. 4
Fig. 5

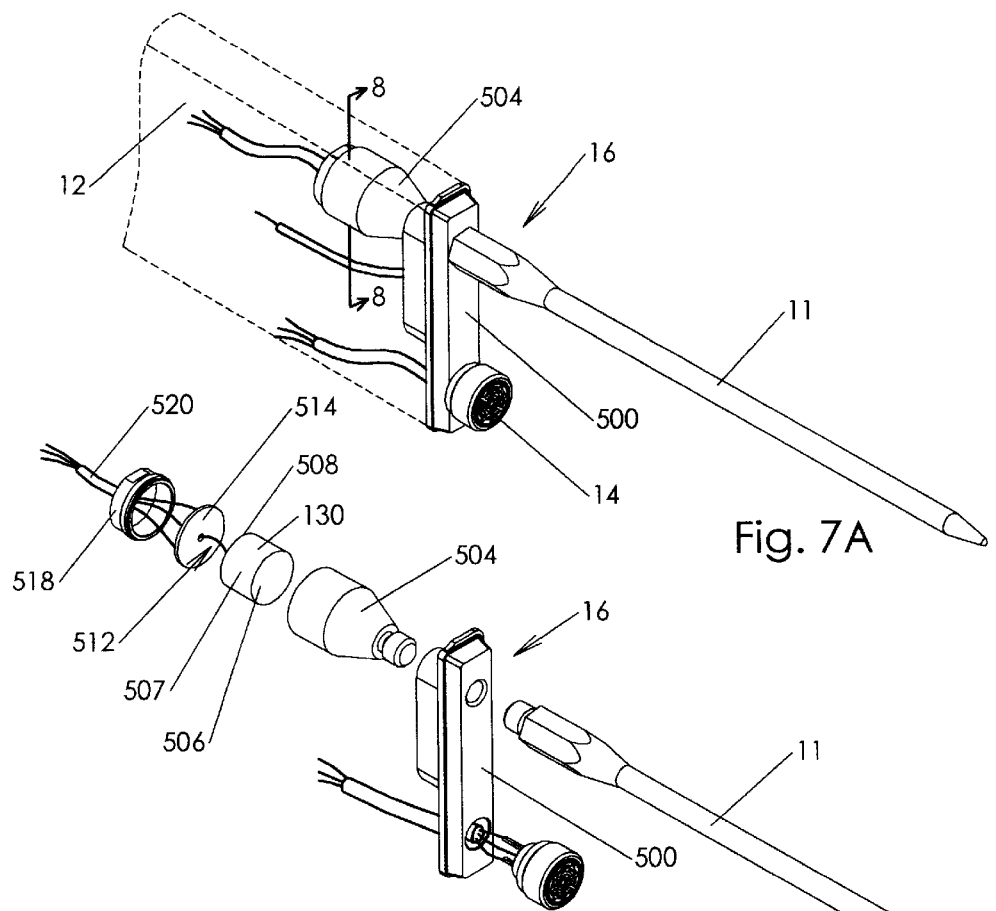
Fig. 7A
Fig. 7B
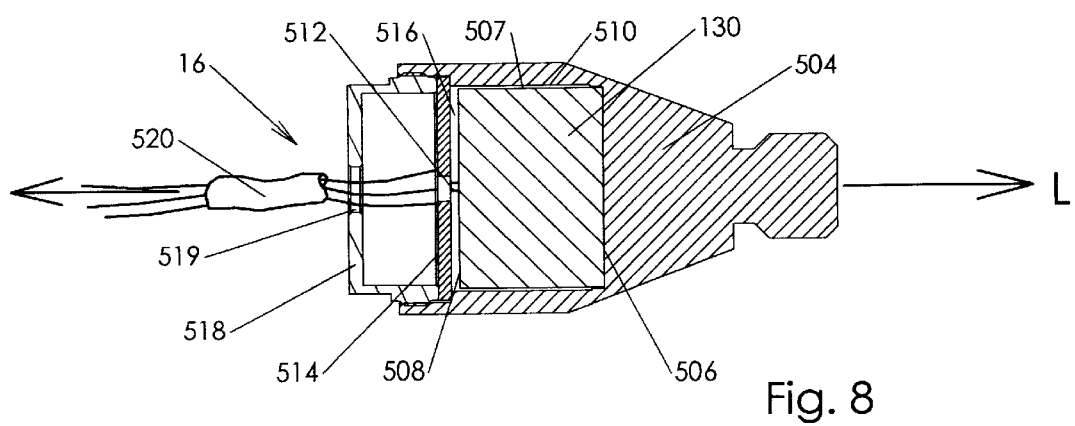
Fig. 8

SIGNAL DETECTOR AND METHOD FOR DETECTING SIGNALS HAVING SELECTED FREQUENCY CHARACTERISTICS

BACKGROUND OF THE INVENTION

A variety of different signal detectors have been developed in the past with many of these including electronic circuits incorporating tuning circuitry adapted to receive, filter and process signals within a selected frequency range. For signal detectors specifically constructed to monitor a broad range of oscillatory signals, certain problems arise where those circuits seek to monitor signals having certain frequency characteristics. For example, many signal detectors exhibit a high susceptibility to noise and produce unreliable readouts where random noise signals fall within the target frequency range. Also, these systems often encounter problems with signal-to-noise ratio for the target signals versus the background noise. In order to solve these problems, many existing signal detectors resort to superheterodyning in order to increase sensitivity, eliminate noise and shift frequency bands. As noted above, the present invention especially concerns itself with the detection of ultrasonic signals in an ambient sound environment, as well as sonic and ultrasonic signals present in solids. The desirability of detecting ultrasonic signals in an ambient sound environment has increased recently due to the recognition that ultrasonic detectors may readily be implemented as leak detectors to detect ultrasonic signals which, for example, are created by the escape of pressurized gases through small openings. This is useful, for example, in detecting leakage from pipelines as well as detecting airflow paths, for example, through insulation of houses and commercial buildings and through automobile doors and panels. Other analytical values of airborne ultrasonic detectors are being discovered as well, such as bearing wear indicators.

Where there is an internal leak within a system, such as a valve leak, a steam trap, or bearing friction, it is beneficial to employ a touch probe to detect the sound because the sound generated is within a solid. As such, it is necessary to contact the solid with the touch probe in order to detect the sound and then convert it into an electrical signal with an acoustic emission sensor for processing.

In recent years, two types of ultrasonic detectors have prevailed in the market. A first type employs a crystal system to mechanically couple an ultrasonic signal to a local oscillator in order to convert the frequency of the input ultrasonic signal to a resultant signal having a frequency within the audible range. While being relatively inexpensive, crystal based systems have exhibited limited performance and have significant sensitivity problems where the ambient environment is quiet. These crystal based systems are also susceptible to noise and have problems with signal-to-noise ratio. In addition, crystal based systems are susceptible to mechanical vibrations and temperature changes which can affect their sensitivity and yield false readings. Further, crystal based systems often and undesirably respond to infra-sonic and sonic signals that modulate the system so that again faulty readings occur. These crystal based systems also have a very limited frequency range for target signals unless there is an ability to adjust the frequency of the local oscillator within the system.

A second system commonly used employs signal mixers that heterodyne a local oscillator with the input signal. Again, these heterodyne systems are susceptible to noise, have problems with signal-to-noise ratio and exhibit a limited frequency range unless the oscillator frequency is adjustable. While these systems do not exhibit problems due to sonic or mechanical vibrations, they are nonetheless susceptible to temperature changes that can yield faulty readings. Further, systems that employ the heterodyne technique require multi-offset settings and are thus difficult to adjust and maintain over an extended period of use.

A much improved ultrasonic detector has been described in my U.S. Pat. No. 5,103,675 issued Apr. 14, 1992. This ultrasonic detector offers superior performance to those discussed above. In its detailed circuitry, the ultrasonic signal detector described in my '675 patent detects ultrasonic signals by a transducer and converts these signals into an electrical transducer signal that is then filtered to remove undesired frequency components to produce a resulting input signal. Processing circuitry is then responsive to the input signal for producing an intermediate signal that has an intermediate frequency scaled from the input signal frequency into an audible frequency. The intermediate signal is then amplified proportionately to the input signal amplitude to produce a detector output signal that is then displayed.

A still further improved ultrasonic detector is described in my U.S. Pat. No. 5,432,755 issued Jul. 11, 1995, the disclosure of which is incorporated herein by reference. The ultrasonic detector described in my '755 patent is particularly directed to a compact, lightweight and portable unit which is relatively inexpensive to produce. This ultrasonic detector produces a relatively clean audio output of the type typically familiar to users of ultrasonic detectors with a minimum number of components. In its detailed circuitry, the ultrasonic signal detector described in the '755 patent utilizes a visual output of peak received signal strength which is more representative of the received signal, as opposed to an average of such signal strength. The ultrasonic detector also utilizes very sensitive heterodyne circuits employing a telecommunications chip, known as a Gilbert Cell mixer, to blend a very high frequency local signal against a received very high frequency signal, typically in the range of 100 MHz to 140 MHz. The use of Gilbert Cell mixer technology had not previously been recognized as appropriate for ultrasonic detectors due to the relatively low frequencies encountered in the ultrasonic environment. Moreover, it had been thought that the technology embodied in the very high frequency in the telecommunications circuitry could not, in fact, be employed at the lower frequencies of ultrasonic signals. Surprisingly, however, I have discovered that such a circuit design can indeed be employed to produce a very low cost, compact ultrasonic detector which exhibits superior performance.

Despite the advantages of my previous ultrasonic signal detectors, there is a need to provide a new and improved signal detector for monitoring both sonic and ultrasonic signals through the incorporation of two different sensor types associated with the instrument, an integrated acoustic emissions sensor, or touch probe, and an airborne sensor. There is a further need for such a unit to have independent sensitivity and volume adjustment so that the instrument is more discriminating, and thus more versatile, while monitoring leaks. It would also be advantageous for such an instrument to operate in a variety of modes and incorporate an erasable and programmable memory for the retention of user-defined parameters per mode, while at the same time permitting digitally generated and tuned band switching as well as field calibration. The present invention is directed to meeting these needs among others.

SUMMARY OF INVENTION

It is an object of the present invention to provide a new and useful signal detector and signal detection methodology for the detection of target signals over a wide target frequency range.

Another object of the present invention is to provide a new and useful signal detector which is relatively inexpensive to produce and which is lightweight, compact, and portable.

A further object of the present invention is to provide a signal detector which is selectively adaptable to monitor either sonic or ultrasonic signals present in an ambient environment, yet has reduced susceptibility to both mechanical vibration and temperature change.

Still a further object of the present invention is to provide a signal detector that is adjustable in sensitivity and displays target signals both visually as well as audibly.

Yet another object of the present invention is to provide a signal detector having a variety of operation modes and an integrated memory to provide retention of user defined parameters per mode as well as field calibration.

To accomplish these objectives, the present invention is directed to a signal detector for monitoring sound signals having frequencies within selected ranges and for producing at least a first output signal in response thereto. Here, the signal detector employs a first sensor element of a first type operative in response to a presence of the sound signals to produce a first electrical signal. The first sensor element is preferably an ultrasonic microphone device. First amplification and filter circuitry operates to receive the first electrical signal to remove all frequency components thereof not within a first selected range and to produce a first input signal at a selected input signal frequency and first input signal amplitude. A second sensor element operates in response to presence of the sound signals to produce a second electrical signal. This second sensor element also has an associated amplification and filter circuitry which operates to receive the second electrical signal to remove all frequency components thereof not within a second selected range and to produce a second input signal at a selected second input signal frequency and second input signal amplitude. This second sensor element is preferably an acoustic emission device in the form of contact probe and it and the first sensor element are mounted to a common housing.

The signal detector also includes an oscillator circuit operative to produce a reference signal at a selected reference signal frequency. A mixer receives this reference signal and a selected one of the first and second input signals to produce a mixed composite signal at a mixed composite signal frequency and mixed composite signal amplitude. A first switch is operative in a first switch condition to selectively interconnect the mixer to the first input signal. In a second switch condition, the switch selectively interconnects the mixer to the second input signal. A first amplifier operates to amplify the mixed composite signal to produce a first output signal which may be appropriately displayed either visually or audibly.

The mixed composite signal may be split into first and second components whereby the first amplifier operates to amplify the first component of the mixed composite signal to produce the first output signal and a second amplifier operates to amplify the second component of the mixed composite signal to produce a second output signal. The signal detector may also include a received signal strength indicator (RSSI) circuit operative to monitor the second amplifier to produce a signal strength indicator signal that is correlated to the selected one of the first and second input signals. Preferably, this RSSI circuit is selectively adjustable for the noise floor of the incoming signals. Here, the signal detector includes a visual display for producing visible output in response to the signal strength indicator signal whereby this visible output indicates the strength of the second component of the mixed composite signal.

The first amplification and filter circuitry may include an associated first sensitivity control circuit which operates in response to the first electrical signal to remove all components thereof above a first selected amplitude range. Likewise, the second amplification filter circuitry also includes an associated second sensitivity control circuit which functions similarly to remove all components of the second electrical signal that are above a second selected amplitude range. Where an audio output device is employed to produce audio sound in response to the first output signal and a volume control circuit is provided to selectively vary the amplitude of the first output signal. Importantly, this volume control circuit is independently adjustable of the first and second sensitivity control circuits. A digital processing circuit may also be provided to independently adjust the volume control circuit in the first and second sensitivity control circuits, as well as the oscillator's reference frequency.

In another embodiment of the present invention the second amplification and filter circuitry includes at least one pre-amplifier operative to amplify the second electrical signal and a high pass filter operative to remove low frequency signals from the second electrical signal. Here, the second electrical signal is split into first and second components between the pre-amplifier and the high pass filter, wherein the first component of the second electrical signal contains all frequencies present including sonic frequencies and the second component is at ultrasonic frequencies. Here, the first switch, when it is in the first condition, interconnects the mixer to the first component of the second electrical signal. A second switch may also be included which is operative in a first switch condition to interconnect to the mixed composite signal and operative in a second switch condition to interconnect to the second component of the second electrical signal. The digital processing circuitry controls the conditions of these first and second switches.

The present invention is also directed to a method for monitoring sound signals in order to indicate a presence of those signal having frequencies within a selected range. Here, a first sensor element of a first type is provided which operates to receive sound signals emanating from a first medium and to generate a first electrical signal in response thereto. A second sensor element of a second type different from the first type is also provided and operates to receive sound signals emanating from a second medium and to generate a second electrical signal in response thereto. Broadly, the methodology comprises the step of selecting one of the first and second electrical signals for processing, processing the selected one of the signals to generate at least a first output signal at a selected output signal frequency and first output signal amplitude and displaying the first output signal.

The step of processing the selected electrical signal includes the steps of amplifying the selected signal and thereafter filtering it to remove all frequency components thereof which do not have a frequency within a selected range, thereby to produce an input signal at an input signal frequency and input signal amplitude. Thereafter, the input signal is mixed with a reference signal to produce a mixed composite signal at a mixed composite signal frequency and mixed composite signal amplitude. This mixed composite signal is filtered to produce the first output signal.

The methodology may also include the step of splitting the mixed composite signal into first and second components thereof whereby the first component of the mixed composite signal is processed to generate the first output signal which is audibly displayed and the second component of the mixed composite signal is processed to generate a second output signal that is visually displayed. Of course, the first and second electrical signals may also be split into first and second components thereof as discussed above.

These and other objects of the present invention will become more readily appreciated and understood from a consideration of the following detailed description of the exemplary embodiments of the present invention when taken together with the accompanying drawings, in which:

BRIEF DESCRIPTION OF DRAWINGS

FIG. 1 is a perspective view of a signal detector according to the present invention;

FIGS. 3(a)–3(f) show the circuit diagram for the analog portion of the signal detector circuitry diagramed in FIG. 2;

FIGS. 4 is a suitable circuit diagram showing how the supply voltage is split to generate virtual ground for the signal detector of FIGS. 1–3;

FIG. 5 is a zener diode used to protect the analog processing circuitry from static electricity charges;

FIG. 7(a) is a perspective view, in partial phantom, showing the mounting of the dual sensors to the signal detector's sensor horn;

FIG. 7(b) is an exploded perspective view showing the construction of the dual sensors and their mounting to the signal detector's sensor horn;

FIG. 8 is a cross-sectional view of the housing for the signal detector's second sensor element;

FIG. 9(a) is a perspective view showing a preferred interconnection between the signal detector's analog and digital circuit boards;

FIG. 9(b) is a side view in elevation also showing the interconnection of the signal detector's analog and digital circuit boards;

DETAILED DESCRIPTION OF THE EXEMPLARY EMBODIMENTS

Figure 2:
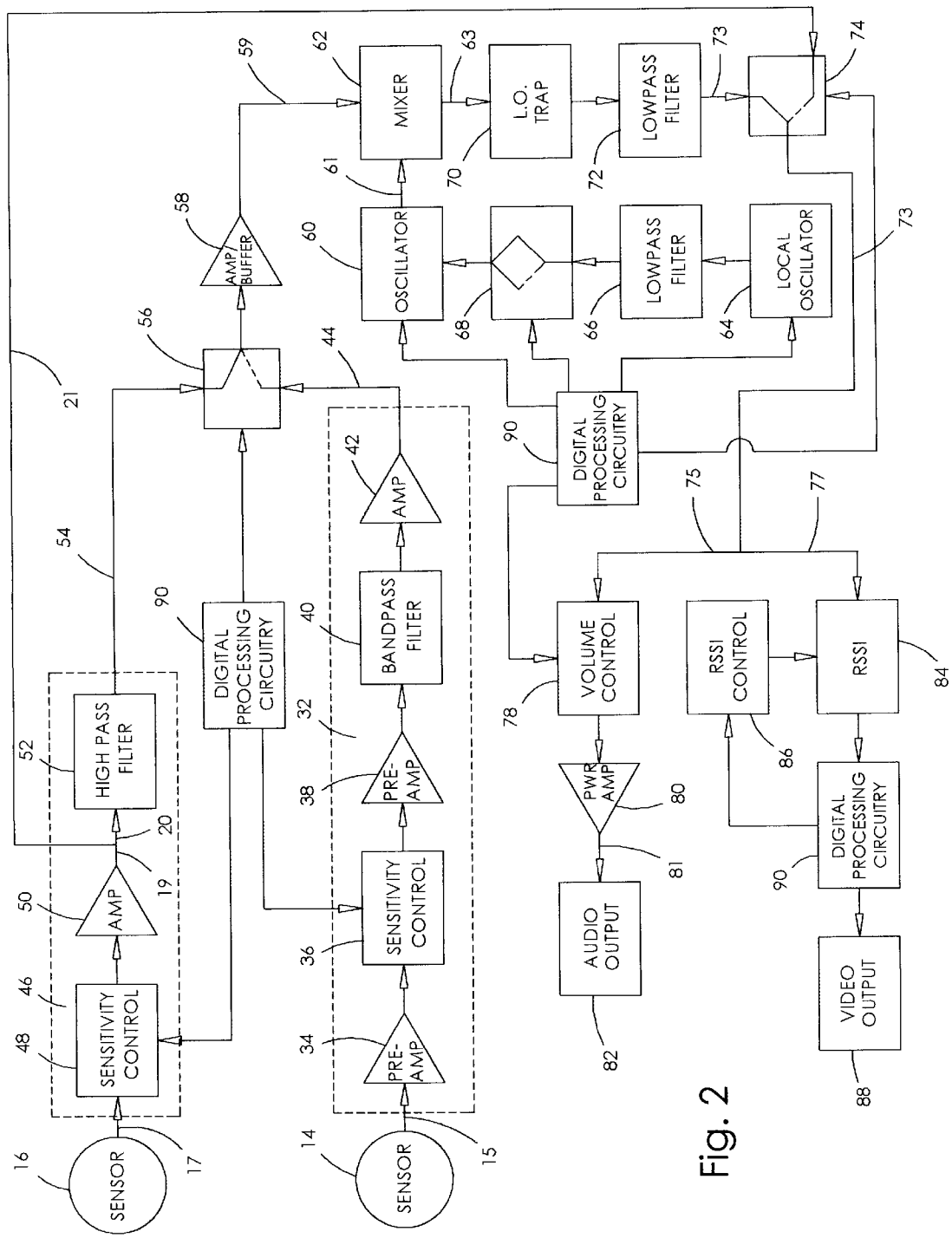
FIG. 2 is a block diagram showing the principal features of the signal detector circuitry according to a first exemplary embodiment of the present invention.

The present invention is directed to detectors for sound signals, especially those adapted to respond over a selected range to convert ultrasonic and sonic signals into a display which may be either audible of visual. More particularly, this invention is directed to a very versatile, yet compact and portable unit which is relatively inexpensive to produce. This signal detector produces a relatively clean audio output of the type typically familiar to users of detectors with a minimum number of components. Moreover, this signal detector produces visual output of peak received signal strength which is more representative of the received signal as opposed to an average of such signal strength. As will be appreciated from the description to follow, the signal detector of the present invention is much more versatile than my previous versions due to its dual sensor construction and digital processing circuitry.

It should be understood that the signal detector and method according to the present invention, for purposes of the exemplary embodiments, are described with respect to the detection of sonic and ultrasonic signals. However, it should further be appreciated and understood that the detector circuitry and methodology described herein has a broader application to the general monitoring of signals so that the techniques described can be employed by the ordinarily skilled person in the field to monitor other signals, for example, electromagnetic signals. Thus, virtually any type of detectable oscillatory signal to which a transducer may respond to produce an electrical signal can be monitored by the present system and method.

With reference then to FIG. 1, the signal detector 10 has a housing 12 which mounts the appropriate processing circuitry which preferably includes analog and digital processing circuitry mounted independent yet interconnected circuit boards. Housing 12 supports two sensors. A first sensor 14 is in the form of a suitable transducer with sensor 14 being selected of a type to receive ultrasonic signals and convert them into suitably corresponding electrical signals for processing. To this end, sensor 14 is preferably an ambient air sensor in the form of a microphonic device to detect ultrasonic signals in ambient air. Second sensor 16 is preferably a contact probe for detecting both sonic and ultrasonic signals in a solid body and converting them into suitably corresponding electrical signals for processing.

Housing 12 also supports a signal strength indicating meter 18 which, in FIG. 1, is in the form of a twenty (20) diode light emitting array which is operative to visually output the signal strength of the received signal from either of sensors 14 or 16. Another visual output in the form of an alphanumeric display 25, also indicates signal strength of the received signal from sensors 14, 16, as well as displaying the various modes of operation and the volume and sensitivity levels for signal detector 10. Audible output is obtained by way of earphones 22 which are electrically connected to the circuitry contained within housing 12. A first push button activation switch 24 is provided to turn signal detector 10 on and off. A second push button activation switch 26 is provided to toggle between the various operational modes for the signal detector, and third and fourth push button activation switches 28 and 30 may be used to selectively adjust the sensitivity and volume levels within a given operational mode.

The principal features of the electronic circuitry to be housed in housing 12 to form a first exemplary embodiment of signal detector 10 are diagrammed in FIG. 2. Here, it may be seen that the circuitry includes first sensor 14 and first amplification and filter circuitry 32 which, itself, includes a first pre-amplifier 34, a sensitivity control circuit 36, a second pre-amplifier 38, a band pass filter 40 and an amplifier 42. With reference to this first amplification and filter circuitry 32 it may be appreciated that first sensor 14 is operative in response to the presence of sound signals, and specifically ultrasonic signals, to produce a first electrical signal 15 which is then processed by first and second preamplifiers 34 and 38, sensitivity control circuit 36, band pass filter 40 and amplifier 42 to produce a first input signal 44 having a selected first input signal frequency and first input signal amplitude which may then be presented to heterodyning circuitry as described below.

The circuitry of FIG. 2 also includes the second sensor 16 and its associated amplification and filter circuitry 46 which includes a second sensitivity control circuit 48, amplifier 50 and high pass filter 52. With reference to this second amplification and filter circuitry 46, it should be appreciated that sensor 16, the contact probe, is operative in response to both sonic and ultrasonic signals to produce a second electrical signal 17 which is adjusted in intensity by sensitivity control circuit 48 and amplified by amplifier 50 to produce an amplified second electrical signal 19 at the output of amplifier 50. This amplified second electrical signal 19 may then be split into first and second components thereof with the first component 20 being presented to high pass filter 52 to produce a second input signal 54 which is at an ultrasonic frequency. The second component 21 of the amplified second electrical signal 19 bypasses high pass filter 52 so that it contains sonic frequencies. As also shown in FIG. 2, a digital processing circuitry 90 which is operative to independently adjust the sensitivity of first and second sensitivity control circuits 36 and 48 as described more thoroughly below.

The first and second input signals, 44 and 54 respectively, are presented to a first electrical switch 56 having a conditional state which is also controlled by digital processing circuitry 90 to selectively choose one of the first and second input signals. The selected one of the first and second input signals, 44 or 54, is presented to an amplifier/buffer 58 to generate an amplified selected input signal 59 which is the presented to a heterodyning circuitry broadly including an oscillator 60 and a mixer 62. Oscillator 60 is operative to produce a reference signal 61 at a selected reference signal frequency within a range of 20 kHz to 100 kHz, depending on the intended range for which the signal detector is intended to operate. Preferably, the reference signal frequency is 38 kHz plus or minus 500 Hz. As discussed more thoroughly below, digital processing circuitry 90 controls the generation of reference signal 61 as dictated by the software program contained in its microcontroller's memory. Generally speaking, though, digital processing circuitry 90 either transmits an oscillatory signal to local oscillator 64 or may be used to instruct a dedicated digital oscillator using direct digital synthesis (DDS) to output the desired frequency. This oscillatory signal then passes through a low pass filter 66 and a second electrical switch 68 whose conditional state is also controlled by digital processing circuitry 90. The purpose of second electrical switch 68, which is driven by the digital processing circuit's microcontroller is to assure the proper energy level of the local oscillator input.

Mixer 62 is preferably a Gilbert Cell device which receives the selected one of the first and second input signals, 44 or 54, and the reference signal 61 to generate a mixed composite signal 63. It should be appreciated then that when first switch 56 is in the first switch condition it selectively interconnects mixer 62 to first input signal 44, and when first switch 56 is in a second switch condition, as shown in FIG. 2, it operates to selectively interconnect mixer 62 to second input signal 54.

Mixed composite signal 63 is appropriately passed through a local oscillator trap 70 and a low pass filter 72 to produce a filtered mixed composite signal 73 which accordingly has a mixed composite signal amplitude, corresponding to the amplitude of the selected one of the first and second input signals, and a mixed composite signal frequency in the audible range (e.g., between 20 Hz and 20 kHz), but it is preferred that the mixed composite signal have a frequency of about 0–5 kHz. Oscillator 60 and mixer 62 can be configured on a common integrated circuit chip such as a telecommunications chip known as NE615 available from Philips Semiconductors in Sunnyvale, Calif.

The filtered mixed composite signal 73 is then presented to a third electrical switch 74 which has its switch state also controlled by digital processing circuitry 90. Also presented to third electrical switch 74 is the amplified second electrical signal 21 associated with second sensor element 16. Digital processing circuitry 90 thus controls which of two signals, either the filtered mixed composite signal 73 which has band shifted characteristics of an ultrasonic signal, or the amplified second electrical signal 21 which has the characteristics of a sonic signal, is ultimately presented to an appropriate output device for display. For example, as shown in FIG. 2, third electrical switch 74 is in a first switch condition such that it passes the filtered mixed composite signal 73 to the appropriate output device (s). For example, filtered mixed composite signal 73 may be split into a first component 75 and a second component signal 77. The first component of the filtered composite signal passes through a volume control circuit 78, controlled by digital processing circuitry 90, and is then amplified by power amplifier 80 to produce a first signal 81 which is then audibly displayed by audio output 82 which, as noted above, may be a pair of earphones.

The second component 77 of the filtered mixed composite signal 73 is fed into a received signal strength indicator (RSSI) circuit 84 whose parameters are adjustable by an RSSI control circuit 86 controlled by digital processing circuitry 90. The output of the RSSI circuit is then processed by the digital processing circuitry 90 and presented to a visual output which may be either the light emitting diode array 18 or the alphanumeric display 25 or both, described with reference to FIG. 1. Here, it should be appreciated that oscillator 60, mixer 62 and the RSSI circuit 84 may be provided by a single integrated circuit chip known as the NE615, again available from Philips Semiconductors. This microcircuit chip is a telecommunications chip designed to operate at very high frequencies, such as, for example, use in cellular telephones, so that it operates in a range of 100 MHz to 140 MHz. It should be appreciated, though, that to create the proper oscillator, mixer and RSSI circuits, suitable connections are made to this microcircuit chip as discussed more thoroughly below with reference to FIG. 3(d).

Figure 6A:
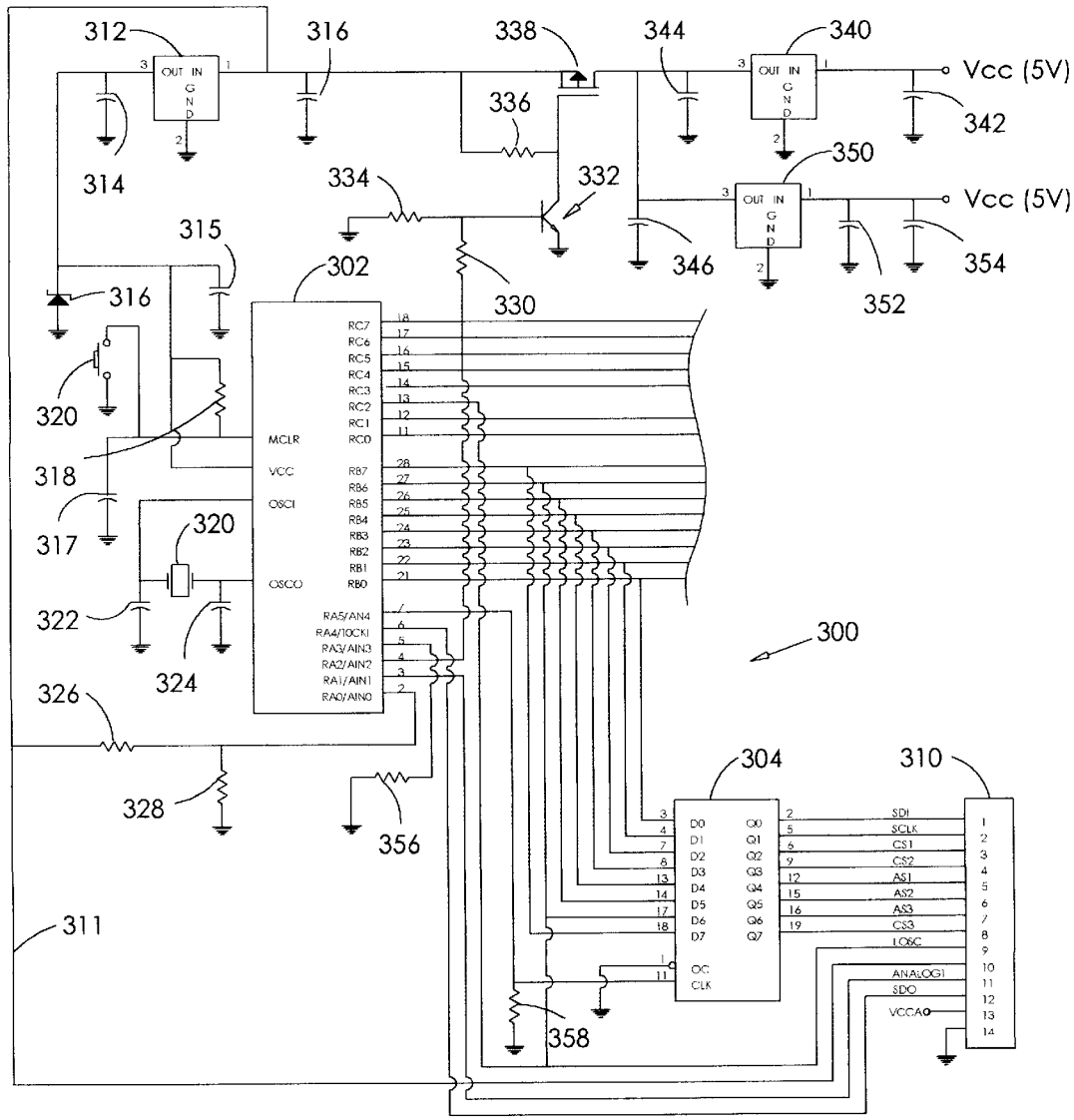
FIGS. 6(a)–6(b) show the circuit diagram for the digital processing portion of the signal detector according to the present invention and the power management of the analog, digital and microcontoller parts.
Figure 6B:
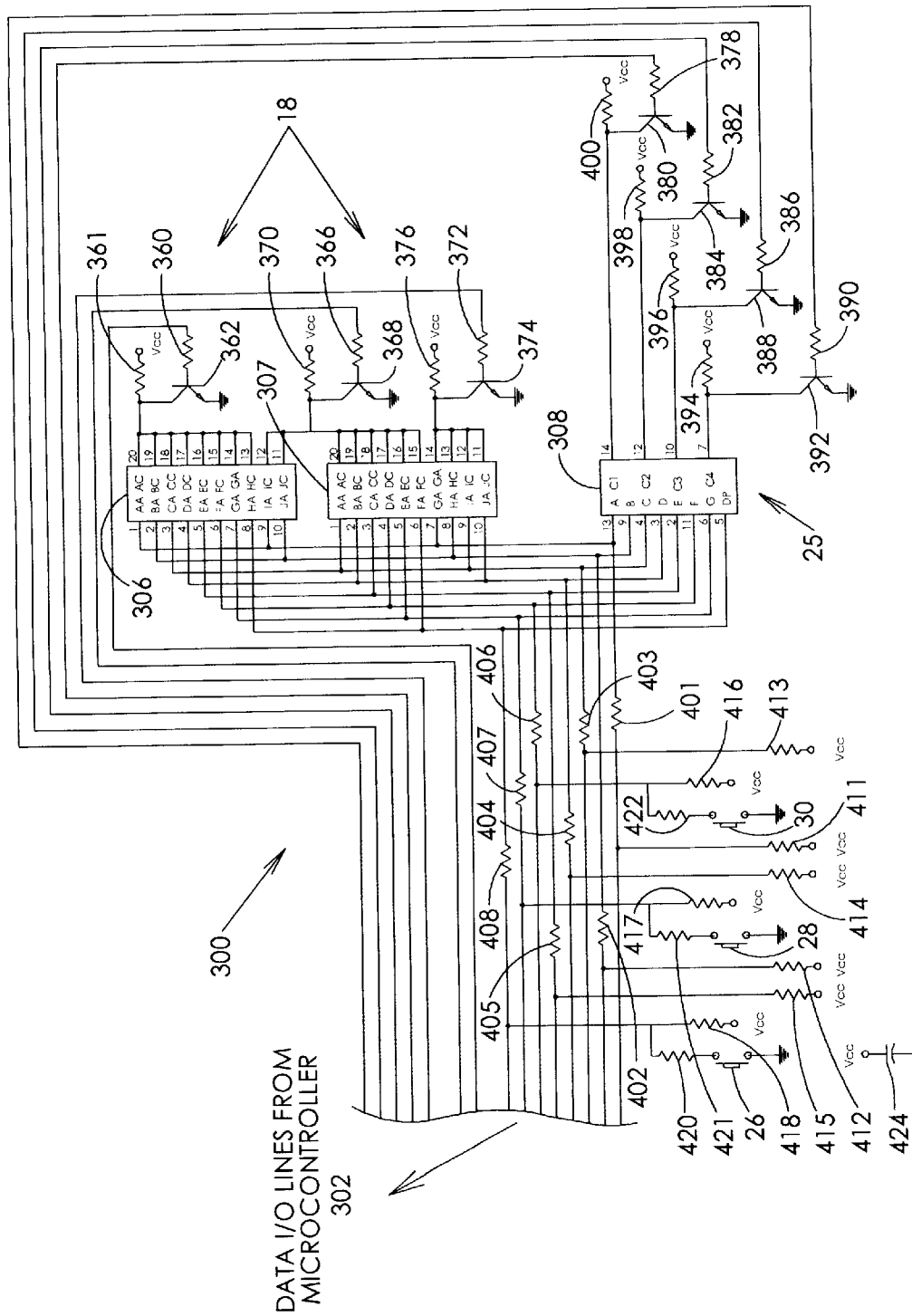

Accordingly, a complete circuit diagram of the circuitry summarily diagrammed in FIG. 2 is shown in FIGS. 3(a)–3(f), 4, 5 and 6(a)–6(b), where FIGS. 3–5 illustrate the analog processing circuitry for the signal detector 10 according to the first exemplary embodiment of the present invention and FIGS. 6(a)–6(b) illustrate the digital processing circuitry for the signal detector 10. Preferably, the analog processing circuitry and the digital processing circuitry are contained on independent circuit boards.

Figure 3A:
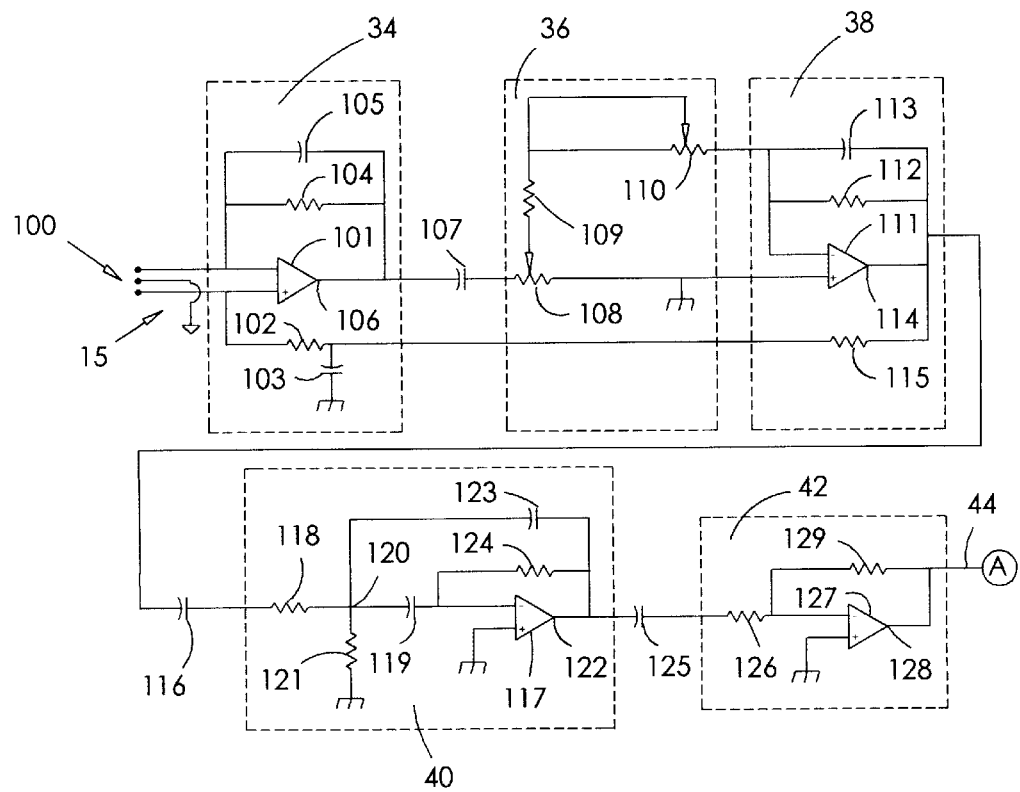

With reference then to FIG. 3(a), it may be seen that the electrical signal 15 produced by first sensor element 14 is input at 100 where it is amplified by means of an inverting first pre-amplifier 101. Here, two of the inputs from first sensor element 14 at 100 are connected to the positive and negative terminals of first pre-amplifier 101, while a third input from the first sensor element at 100 is connected directly to chassis ground. The positive or non-inverting input terminal of amplifier 101 is connected to virtual ground by way of a resistor 102 and a capacitor 103, while the negative or inverting input of amplifier 101 is connected to its output by means of a resistor 104 and a capacitor 105 connected and parallel to one another to set the gain of amplifier 101.

The output 106 of first pre-amplifier 101 is connected to sensitivity control circuit 36 by way of a coupling capacitor 107. Sensitivity control circuit 36 includes an electronic potentiometer 108 which varies the input signal from maximum to zero. Electronic potentiometer 108 may be an AD8402 device available from One Technology Way in Norwood, Mass. Resistor 109 and potentiometer 110 form the wiper arm of electronic potentiometer 108 to provide overall gain adjustment for the microphonic airborne sensing section of the signal detector. Electronic potentiometer 108 is connected to virtual ground as well as the non-inverting input of second pre-amplifier 111. The inverting input of second pre-amplifier 111 is connected to its output by means of a resistor 112 and a capacitor 113 which are connected in parallel to set the gain of second pre-amplifier 111 and are also connected in series with potentiometer 110 of sensitivity control circuit 36.

The output 114 of second pre-amplifier 111 is connected to virtual ground by way of a resistor 115 and capacitor 103. This connection between the output 114 of amplifier 111 and the input of amplifier 101 forms a feedback loop around the first pre-amplifier 101, the sensitivity control circuit 48 and the second pre-amplifier 111 to act as a frequency selective amplifier.

Moreover, the output of second pre-amplifier 111 is connected to a band pass filter 40 by connecting the output 114 of second pre-amplifier 111 to the inverting negative input of amplifier 117 through a coupling capacitor 116, a resistor 118 and a capacitor 119 connected in series. The interconnect 120 between resistor 118 and capacitor 119 is connected to virtual ground by means of resistor 121, and it is connected to the output 122 of amplifier 117 by means of a capacitor 123. The positive input of amplifier 117 is connected to virtual ground and the negative input is connected to output 122 by means of a resistor 124. The center frequency and band width of this filter is thus set by resistors 118, 121, 124 along with capacitors 119 and 123. Preferably, band pass filter 40 has a center frequency of 38 kHz and a band pass that is approximately between 36 and 44 kHz.

The filtered signal from output 122 of amplifier 117 is interconnected via a coupling capacitor 125 and a resistor 126 connected in series, to the inverting input of an amplifier 127. The positive input of amplifier 127 is connected to virtual ground while the amplifier's output 128 is connected to its negative terminal by means of a resistor 129. Together, amplifier 127 and its resistors 126 and 129 form an amplification circuit 42 which receives the filtered first electrical signal and provides the first input signal 44 for the remainder of the processing circuitry as shown at "A" in FIG. 3($a$).

With reference now to FIG. 3($b$), the circuitry for second sensor element 16 includes a piezoelectric crystal 130 connected in parallel with a resistor 131. One terminal of piezoelectric crystal 130 is connected to the gate of source follower JFET 132, A2N3B19 or equivalent, while another of the piezoelectric crystal's terminals is connected to chassis ground. The drain of JFET 132 is connected to chassis ground by way of capacitor 134, and this drain is also connected to the supply voltage's positive rail or $V_{cc}$ by way or resistor 135. The source of JFET 132 is connected through resistor 133 to chassis ground and it is also connected via coupling capacitor 137 to second sensitivity control circuit 48 which includes an electronic potentiometer 136, also an AD8402, which is variable from maximum to zero and a coupling capacitor 139 and potentiometer 138 connected in series. The electrical signal being output from the sensitivity control circuit 48 is then presented to the negative input of an amplifier 139 by means of resistor 140. The positive input of amplifier 139 is connected to chassis ground, while the output 141 of amplifier 139 is connected to its inverting input by means of a resistor 142 and capacitor 143 connected in parallel. Amplifier 139 is preferably a portion of an LM837 chip available from National Semiconductor Corp. in Arlington, Tex. with pin 11 thereof connected directly to chassis ground and pin 4 thereof connected to $V_{cc}$ via resistor 135. The gain of amplifier 139 is set by variable resistor 138, resistor 140, resistor 1142, and capacitor 143. Resistor 138 is the overall gain setting adjustment for the contact probe section of the signal detector.

The output 141 of amplifier 139 is thus an amplified second electrical signal 19 which may be split into first and second components thereof. The first component 20 of the amplified second electrical signal 19 is then passed through a coupling capacitor 144 for filtering by high pass filter 52. High pass filter 52 is tuned to approximately 15 kHz so that it passes mostly signals in the ultrasonic frequency range. High pass filter 52 includes an amplifier 145 which has its positive terminal connected to virtual ground by means of resistor 146. The amplifier's positive terminal is also interconnected to coupling capacitor 144 by another capacitor 147. The juncture between capacitors 144 and 147 is connected to the amplifier's negative terminal by means of resistor 149 and this negative terminal is connected directly to the amplifier's output 148. As such, a second input signal 54 having an ultrasonic frequency is generated and shown at "B" in FIG. 3($b$). The second component 21 of the amplified second electrical signal 19 is at a sonic frequency because it bypasses high pass filter 52 and this second component is shown at "C" in FIG. 3($b$).

In FIG. 3($c$) it may be seen that the first input signal "A" from the first sensor element 14 and the second input signal "B" from the second sensor element 16 are presented to first electrical switch 56 which, as stated above with reference to FIG. 2, is controlled by the digital processing circuitry 90 and is operative to interconnect a selected one of these first and second input signals 44 and 54, to amplifier/buffer 58. In FIG. 3($c$), as in FIG. 2, first switch 56 is shown in a second switch condition so that it passes the second input signal 54 from the contact probe to amplifier/buffer 58. Amplifier/buffer 58 includes an amplifier 150 whose positive input is connected to switch 56 via coupling capacitor 151. The positive input is also connected to virtual ground by resistor 152. The negative input of amplifier 150 is connected to the amplifier's output 153 by a resistor 154 and a capacitor 155 connected in parallel. The parallel arrangement of resistor 154 and capacitor 155 as well as the negative input of amplifier 150 are connected to virtual ground via resistor 156. Resistors 154, 156 and capacitor 155 set the gain of the non-inverting amplifier 150 to be approximately two (2). The purpose of incorporating amplifier/buffer 58 is to receive the selected one of the first and second input signals from switch 56 and to compensate for losses in the switch. The amplified input signal 59 at the output of amplifier/buffer circuitry 58 is shown as "D" in FIG. 3($c$).

With reference to FIG. 3($d$), the selected one of the input signals at "D" is connected to pin 1 of chip 158 (the NE615) through a capacitor 160 to chip 158. As shown in diagrammatic form, this chip 158 has internally configured circuitry including a Gilbert Cell mixer device 62, an oscillator 60, high-frequency/high-gain amplification circuitry 163 and RSSI circuitry 164. Pin 2 of chip 158 is connected to the negative rail by way of capacitor 165. Pins 3 and 4 of chip 158 are associated with the oscillator 60. Pin 3 is connected to chassis ground by way of a capacitor 166 and a resistor 167 connected in parallel. Pin 4 is connected to chassis ground by means of two capacitors, 168 and 169 connected in series. Connected to the junction of these capacitors is an inductor 170 which is in series with parallel resistors 171 and 172. The junction between inductor 170 and resistors 171 and 172 is interconnected to ground by means of a capacitor 173.

Capacitors 169, 173 and inductor 170 form a low pass filter which is driven by either resistor 171 or resistor 172 depending on the state of a third switch 68. Switch 68 receives an oscillation signal "O" from the digital processing circuitry's microcontroller and is driven by the microcontroller to connect to either resistor 171 or resistor 172, which assures the proper drive level of the local oscillator at pin 4 of chip 158. This local oscillator input from the digital processing circuitry's microcontroller is a pulse width modulated ("PWM") pulse train which has higher energy content in lower frequencies because of the longer duty cycle. This generates higher voltage amplitudes at lower frequencies which can overdrive the NE615.

As will be discussed below with reference to the digital processing circuitry of FIG. 6(a) and 6(b), the signal detector of the present invention has a variety of modes for each of the sensors. Where ultrasonic signals are of interest, the signal detector can monitor signals having both high and low ultrasonic frequencies. In order to accomplish this, the digital processing circuitry's microcontroller generates a given oscillation signal at "O" having a selected oscillation frequency dependent upon the particular mode. The microcontroller activates switch 174 so that high frequency oscillation signals pass through resistor 171 which is lower in value than resistor 172. Likewise, lower oscillation frequency signals pass through resistor 172.

The circuitry connected to pins 3 and 4 of chip 158, along with the chip's internal components, form oscillator 60 that provides the selected reference signal 61 to be combined with the selected one of the input signals at pin 1. For high frequency ultrasonic signals detected by either of the sensors, this reference frequency is preferably tuned by the microcontroller to 38 kHz so that the mixed signal will have an audible 2 kHz component when the ultrasonic signal is 40 kHz (that is the difference, 40 kHz–38 kHz=2 kHz) along with high frequency components derived from the sum of the input frequency and the reference frequency (and its harmonics). For low ultrasonic frequencies detected by the touch probe, this reference frequency is preferably 20 kHz. For low frequency ultrasonic signals which are airborne and detected by the microphonic device this reference frequency is preferably 30 kHz.

Figure 3B:
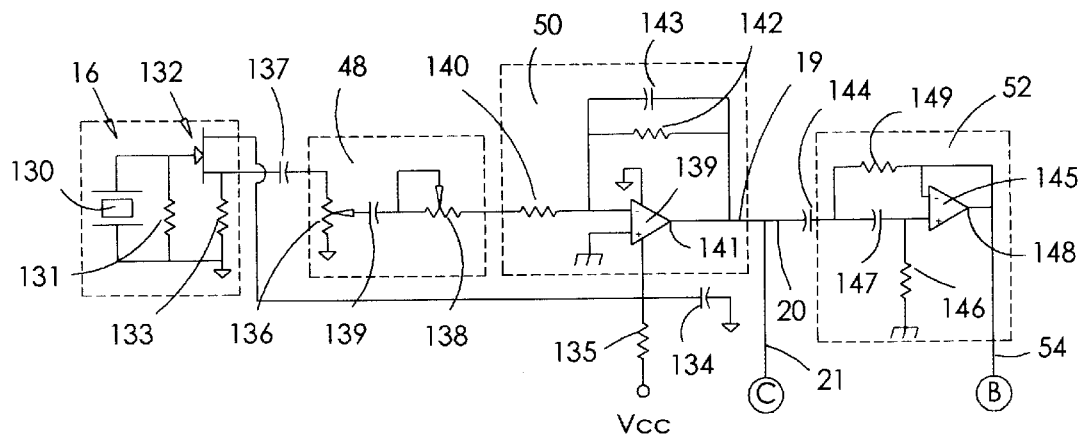

The output of the mixer 62 of chip 158 is the mixed composite signal 63 at pin 20, and a composite signal filter is provided to remove oscillator leakage from this mixed composite signal 63. In FIG. 3(d), this composite signal filter is provided by an L-C tank formed by capacitor 175 and inductor 176 connected in parallel thereto which forms a band reject filter (and with capacitor 177 the local oscillator trap 70) (FIG. 2). This L-C tank passive filter is tuned to a frequency range to remove signals having a frequency of 38 kHz. The L-C tank acts as a trap in order to remove leaked oscillator frequency and higher intermodulation products from the mixed composite signal 63 by shorting them to ground through capacitor 177. Capacitor 178 interconnects pin 17 and pin 19, and pin 17 is connected to ground by way of capacitor 179. Capacitors 178 and 179 set the feedback and bypass for the internal amplifier circuitry of chip 158 to optimize signal-to-noise ratio.

Output from a first internal amplifier circuit of internal amplifier circuitry 163 is at pin 16 and passes through the RSSI control circuit 86 which acts as an attenuator/low pass filter. Specifically, pin 16 of chip 158 is connected to ground by way of a potentiometer 180, which also may be AD8402, and a capacitor 181 connected in series. The wiper arm of this potentiometer is connected to pin 14 and the input of a second internal amplifier circuit by way of capacitor 182. Pin 14 is itself connected to chassis ground by means of capacitor 182 and capacitor 183. Capacitors 184 and 185 set the bypass and feedback of the internal amplifiers 163. Here, capacitor 184 interconnects pins 12 and 13 of chip 158 while pin 13 is connected to chassis ground by way of capacitor 185.

The internal amplifiers of internal amplifier circuitry 163 are connected to the internal RSSI circuitry 164 in order to produce a signal strength indicator signal "S" from pin 7 of chip 158. This signal is connected to ground by way of a capacitor 186 and a resistor 187 connected in parallel. This signal strength indicator signal "S" is ultimately output to the video output 88. Capacitor 186 filters AC ripple of the RSSI signal, and its value determines the speed at which the RSSI can change. A small value will cause the LED meter (FIG. 1) to respond very fast, but it may be difficult to read especially if the input signal fluctuates. Resistor 187 is employed to convert the RSSI signal, which is a DC current, to DC voltage which is then used by the microcontroller to calculate the level and drive the alphanumeric display 25 (FIG. 1). Pins 5 and 6 of chip 158 are connected together and to $V_{cc}$ via resistor 188; pins 5 and 6 are also connected to chassis ground by way of capacitors 189 and 190 connected in parallel. Thus, power is supplied to chip 158.

Once the mixed composite signal 63 from mixer 62 is appropriately filtered by the L-C tank it passes through a low pass filter 72. This mixed composite signal is represented as "M" in FIGS. 3(d) and 3(e). The mixed composite signal 63 initially passes through a coupling capacitor 192 which is interconnected to virtual ground via resistor 193. Capacitor 192 is also connected to the positive terminal of an amplifier 194 via resistors 195 and 196. The amplifier's positive input is connected to ground via a capacitor 197. The negative input of amplifier 194 is connected directly to the amplifier's output 198 and is also connected to the amplifier's positive input via resistor 196 and a capacitor 199.

Figure 3C:
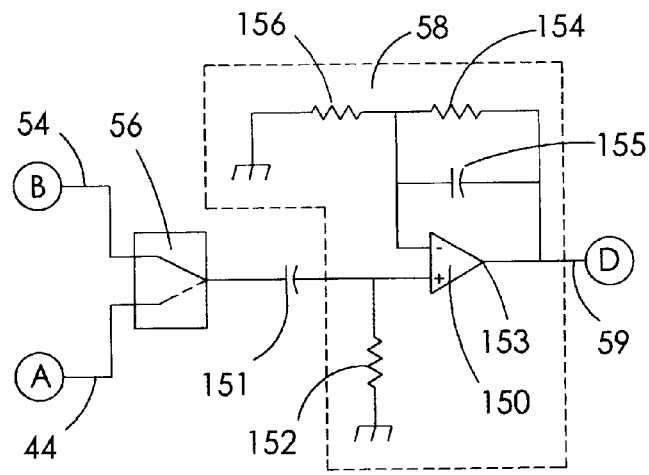
Figure 3E:
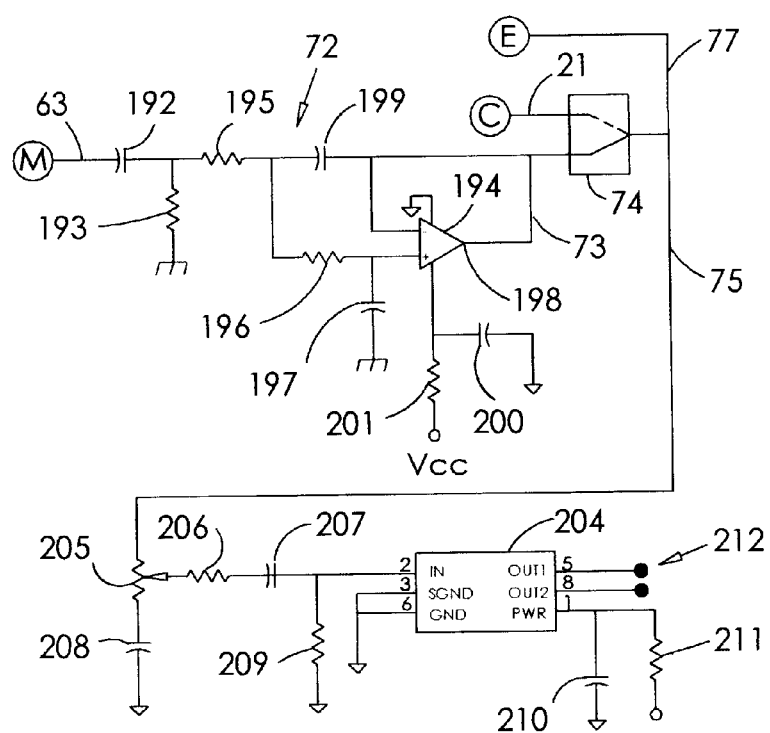
Figure 3D:
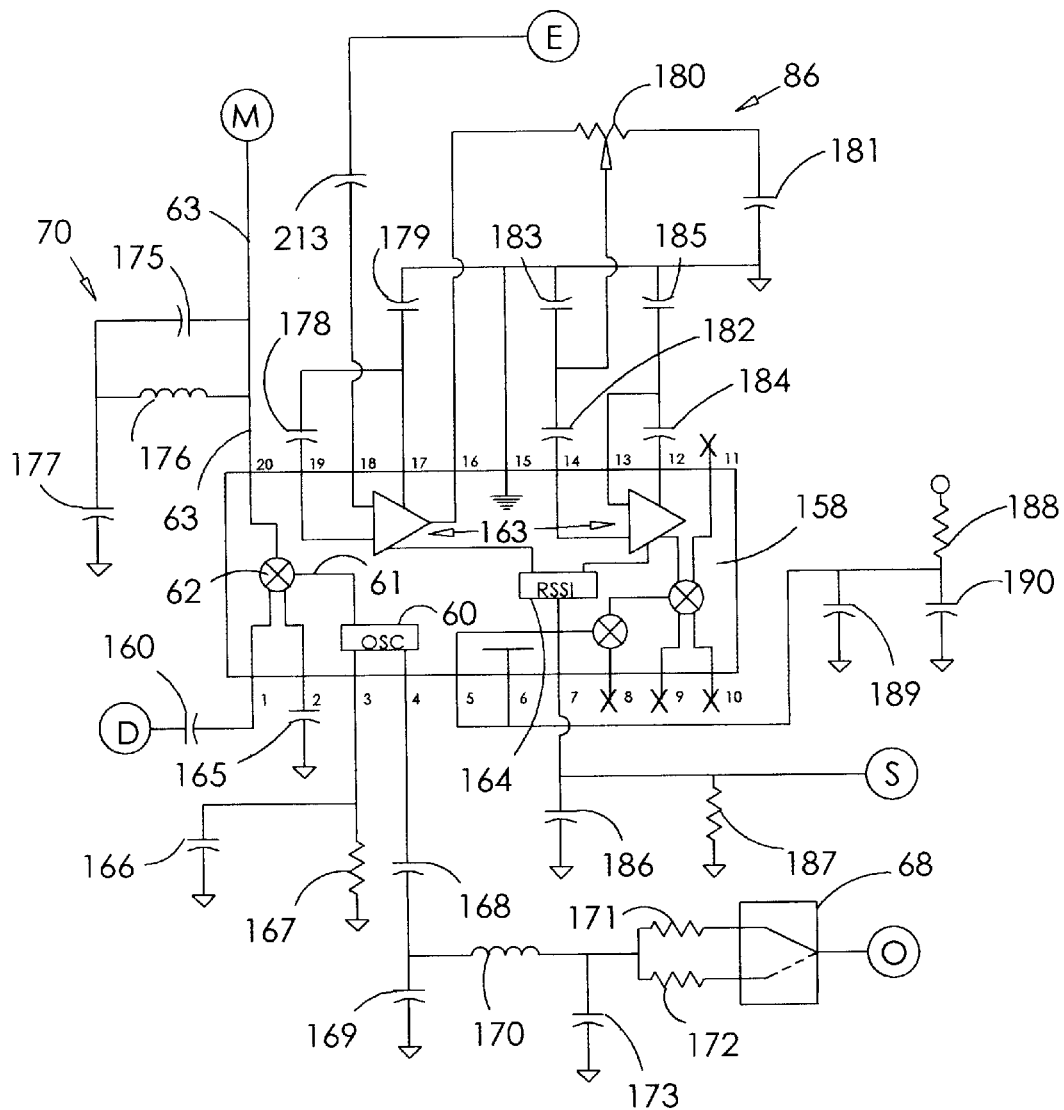

Amplifiers 122, 128, 153 (from FIGS. 3(a) and 3(c)) and amplifier 198 are preferably stages of a quad amplifier integrated circuit chip, such as an LM-837 available from National Semiconductor Corp., or any equivalent chip. Pin 11 of this chip is then connected directly to ground and pin 4 of this chip is connected to virtual ground via capacitor 200 and to $V_{cc}$ via resistor 201 as shown in FIG. 3(e).

The output of low pass filter 72 is a filtered mixed composite signal 73 which drives a sonic/ultrasonic switch 74, the state of which switch is dictated by software contained in the memory of the digital processing circuitry's microcontroller. As such, when sonic/ultrasonic switch 74 is in a first switch condition, as shown in FIG. 3(e), it operates to receive the filtered mixed composite signal 73. When sonic/ultrasonic switch 74 is in a second switch position, it is operative to receive the amplified second electrical signal 21 which is already at a sonic frequency. As will be recalled, this amplified second electrical signal is the same as "C" in FIGS. 3(b) and 3(e).

The received signal from sonic/ultrasonic switch 74 is then split into first and second components thereof. A first component 75 is presented to pin 2 of chip 204 by way of a digital potentiometer 205 (AD8402), a resistor 206 and a capacitor 207 connected in series. Chip 204 is preferably a TDA-7052, LM380 or equivalent power audio amplifier. Digital potentiometer 205 is connected to virtual ground via a grounding capacitor 208. This digital potentiometer 205 is independently controlled by the microprocessor of the digital processing circuitry to adjust the volume of the output from chip 204. Pin 2 of chip 204 is also connected to ground via a resistor 209. Pin 1 of chip 204 is connected to ground by capacitor 210 and is also connected to V via resistor 211 to provide power for chip 204. Pins 3 and 6 of chip 150 are connected to ground while pins 5 and 8 provide the audio output which may be connected to the audio display such as earphones 22 shown as earphone jacks 212.

Second component 77 or "E" is fed back into pin 18 of chip 158 via capacitor 213 for processing by the chip's internal RSSI circuitry to generate the RSSI signal "S", as shown in FIG. 3(d). As shown in FIG. 3(f), this RSSI signal "s" is connected to pin 11 of a first connector 210. As will be discussed more thoroughly below, connector/header 210 is matable with a cooperative connector/header associated with the digital processing circuitry board. To communicate data to and from the digital processing circuit's microcontroller, a variety of digital processing chips are also connected to connector 210 as shown in FIG. 3(f). For example, chip 212, which is preferably an AD8402+ available from Analog Devices located in Norwood, Mass., houses and controls the volume adjustment of potentiometer 205 (FIG. 3(e)), as well as the digital potentiometer's associated with the first and second sensitivity control circuits, 36 and 48, respectively (FIG. 3(a) and FIG. 3(b)). Pins 1 and 5 of chip 212 are connected to ground. Pins 6 and 10 of chip 212 are connected to $V_{cc}$ via a resistor 217 and pin 11 is connected directly to $V_{cc}$. Pins 1, 5, 6, 10 and 11 of chip 214 are likewise connected. Pin 1 of first connector 210 is connected directly to pins 8 of chips 212 and 214, while pin 2 of connector 210 is connected directly to pins 9 of chips 212 and 214. Pin 3 of connector 210 is connected to pin 7 of chip 212, while pin 4 of connector 210 is connected to pin 7 of chip 214.

Chip 216, which is preferably a 74HC4053+available from the National Corporation in Texas, houses and controls the state of switches 56, 68 and 74. Pins 6, 7 and 8 of chip 216 are connected to ground. Pin 16 is connected to $V_{cc}$ to provide power to chip 216. Pin 9 is connected directly to pin 7 of jack 210; pin 10 of chip 216 is connect directly to pin 6 of first connector 210, and pin 11 of chip 216 is connected directly to pin 5 of first connector 210.

Finally, chip 218 is an EEPROM which holds the calibration settings and serial number for the detector and allows the detector's analog board to be calibrated and serialized independently of its digital 1board. Chip 218 is preferably a 93LC46 available from the Microchip Technology, Inc. in Chandler, Ariz. Pin 1 of chip 218 is connected to pin 8 of first connector 210; pin 2 of chip 218 is connected to pin 2 of connector 210; pin 3 of chip 218 is connected to pin 1 of connector 210; pin 4 of chip 218 is connected to pin 12 of connector 210, and pin 6 of chip 218 is connected to ground. Pin 10 of connector 210 is connected to a nine volt (9V) battery 220. Pin 13 of connector 210 is connected to $V_{cc}$, and pin 14 of connector 210 is connected to ground.

As shown in FIG. 4, supply voltage $V_{cc}$ is split by capacitors 222, 223 and 224, as well as resistors 225 and 226, to generate virtual ground. As shown in FIG. 5, supply voltage $V_{cc}$ is also connected to chassis ground via an appropriate zener diode.

The digital processing circuitry 300 for the signal detector according to the present invention may now be appreciated with reference to FIGS. 6(a) and 6(b). As stated above, digital processing circuitry 300 is contained on a separate circuit board from the analog processing circuitry discussed in FIGS. 3(a)–3(f). Broadly, digital processing circuitry 300 includes a microcontroller 302, a data latch 304, the 20-LED bar graph display 18 and the alphanumeric display 25. The heart of digital processing circuitry 300 is microcontroller 302 which communicates data back and forth with the analog circuitry board via data latch 304 and second connector 310, as well as with the LED array 18 (including chips 307 and 308) and the alphanumeric display 25 (including chip 308). Microcontroller 302 is preferably a PIC16C73A chip available from Microchip Technology, Inc in Chandler, Ariz. Microcontroller 302 is connected to the remaining components of digital processing circuitry 300 as shown in FIGS. 6(a) and 6(b) and a software program may be appropriately stored in its memory to control all of the user mode parameters for the signal detector.

Power is supplied to microcontroller 302 at pin 20 thereof. As noted above with reference to FIG. 3(f), the 9 volt battery is connected directly to pin 10 of first connector 210, which is itself matable with pin 10 of second connector 310 associated with the digital processing circuitry 300. Of course, it should be appreciated that each of the pores of second connector 310 are matable with and correspond to the pins of first connector 210. As shown in FIG. 6(a), power from the battery is supplied via line 311 to the input (pin 3) of a first voltage regulator 312. Voltage regulator 312 is always "on" as long as the battery is in good condition and this powers the microcontroller 302 with a constant voltage and protects it from a reversed battery condition. Pin 2 of voltage regulator 312 is grounded and pin 1 is also grounded via capacitors 314, 315 and an appropriate zener diode 316. Zener diode 316 protects the microcontroller 302 from over voltage transients. Pin 20 of microcontroller 302 is connected via capacitor 314 and to zener diode 316. Pin 1 of microcontroller 302 is a master clear and is connected directly to ground via capacitor 317.

Pin 1 is also connected to pin 20 via resistor 318 and is connected to ground via on/off switch 24. Resistor 318 is a pull up resistor that sets the master clear of the microcontroller to a "high" condition. The master clock frequency for microcontroller 302 is provided by means of a 4 MHz piezoelectric crystal 320 connected between pins 9 and 10. Opposed faces of crystal 320 are also connected to ground via capacitors 322 and 324. Pin 2 of microcontroller 302 is connected to the battery via resistor 326 and to ground via resistor 328. Resistors 322 and 328 form a voltage divider that monitors the battery voltage and drives pin 2 of the microcontroller to generate a low battery condition that is displayed on the alphanumeric display 25.

Pin 4 of microcontroller 302 is connected via resistor 330 to the base of npn transistor 332. The base of this transistor is also connected to ground via resistor 334. The collector of transistor 332 is connected to the battery voltage via resistor 336. Capacitor 316 is connected to the input (pin 3) of first voltage regulator 312, and it along with capacitor 315 operates to filter noise and keep voltage regulator 312 stable.

The collector of transistor 332 is connected to the gate of MOSFET 338, and the source of MOSFET 338 is connected to the input of a second voltage regulator 340 which supplies 5 volts of power ($V_{cc}$) to the digital circuits. Pin 1 of second voltage regulator 340 is connected to ground via a capacitor 342. Pin 2 is connected directly to ground, and pin 3 is connected to ground via capacitors 344 and 346. Pin 3 of second voltage regulator 340 is connected to pin 3 of a third voltage regulator 350 which supplies 5 volts of power ($V_{cc}$)

to the analog circuits. Pin 1 of third voltage regulator 350 is connected to ground via capacitors 352 and 354 and pin 2 thereof is connected directly to ground. Accordingly, when on/off switch 24 is depressed, transistor 332 turns on, as does MOSFET 338, which operates to connect the 9 volt battery to second voltage regulator 340 and third voltage regulator 350 to supply power to the analog and digital circuits. Voltage regulators 312, 340 and 350 are each preferably LM2931Z-5 available from National Semiconductor Corp. in Arlington, Tex.

Pin 5 of microcontroller 302 is connected to ground via resistor 356. Pin 6 of microcontroller 302 is connected directly to port 12 of second connector 310 and, thus, pin 4 of EEPROM chip 218 in FIG. 3(f).

Pin 7 of microcontroller 302 is connected to ground via resistor 358 and is also connected to the 1clock input (pin 11) of data latch 304, which is preferably an MM74HC374 chip available from National Semiconductor Corp.

Pins 11–18 of microcontroller 302 form a first eight bit bi-directional I/O port which generate strobe signals for the LED array 18, the alphanumeric display 25 as well as the local oscillator signal to the NE615 chip 158 in FIG. 3(d). More specifically, pin 11 of microcontroller 302 is connected via resistor 360 and npn transistor 362 to pins 13–18 of chip 306. Pins 13–20 of chip 306 are also connected to $V_{cc}$ via resistor 364. Similarly, pin 12 of microcontroller 302 is connected via resistor 366 and transistor 368 to pins 11 and 12 of chip 306 and pins 15–20 of chip 307. Pins 11 and 12 of chip 306 and pins 15–20 of chip 307 are also connected to $V_{cc}$ via a resistor 370. Chips 306 and 307, which together form LED array 18, may each be an HDSP-4830 chip available from Hewlett-Packard in Palo Alto, Calif.

Pin 13 of microcontroller 302 communicates the oscillator's reference signal to port 9 of second connector 310 and, thus, to pin 4 of chip 158, as shown in FIG. 3(d). Pin 14 of microcontroller 302 is interconnected to pins 11–14 of chip 307 via resistor 372 and npn transistor 374. Pins 11–14 of chip 307 are connected to $V_{cc}$ via a resistor 376.

Pins 15–18 of microcontroller 302 are respectively connected to pins 14, 12, 10 and 7 of alphanumeric display chip 308. More specifically, pin 15 of microcontroller 302 is connected to pin 14 of chip 308 via resistor 378 and npn transistor 380. Pin 16 of microcontroller 302 is connected via resistor 382 and npn transistor 384 to pin 12 of chip 308. Pin 17 of microcontroller 302 is connected to pin 10 of chip 308 via resistor 386 and npn transistor 388. Pin 18 of microcontroller 302 is connected via resistor 390 and npn transistor 392 to pin 7 of chip 308. Pins 7, 10, 12 and 14 of chip 308 are respectively connected to $V_{cc}$ via resistors 394, 396, 398 and 400.

Chip 307 which forms alphanumeric display 25 may be a DL-340M chip available from Siemens Components, Inc, of Cupertino, Calif.

Pins 21–28 of microcontroller 302 are respectively connected to associated pins of chips 306, 307 and 308 by means of resistors 401–408. Chips 306, 307 and 308 also have some of their pins interconnected to one another as shown in FIG. 6(b). Pins 21–28 of microcontroller 302 are also directly connected to appropriate pins of latch chip 304 as shown in FIG. 6(a). Pins 21–28 of microcontroller 302 are also respectively connected to $V_{cc}$ via resistors 411–418. Pin 28 is also connected to ground via a resistor 420 and push button switch 26 connected in series (FIG. 1). Pin 27 is connected to ground via a resistor 421 and push button switch 28 connected in series (FIG. 1). Pin 26 is connected to ground via a resistor 422 and a push button 30 connected in series (FIG. 1 ). $V_{cc}$ is connected to ground via a capacitor 424.

With respect to data latch 304, pins 3, 4, 7, 8, 13, 14, 17 and 18 thereof are respectively connected to pins 21–28 of microcontroller 302. Pins 2, 5, 6, 9, 12, 15, 16 and 19 thereof are respectively connected to ports 1–8 of second connector 310. Pin 1 of chip 304 is connected to ground and pin 11 of chip 304 is connected to ground via a resistor 358. Finally, port 13 of second connector 310 is connected to the $V_{cc}$ for the analog circuits which is generated as the output of third voltage regulator 350, and port 14 thereof is connected to ground.

With the above described circuitry in mind, a component chart including selected values is set forth in the following Table I.

TABLE I

| Resistors | |
| --- | --- |
| Element | Value (in ohms) |
| 102 | 22 k |
| 104 | 22 k |
| 109 | 422 |
| 112 | 100 k |
| 115 | 22 k |
| 118 | 10 k |
| 121 | 422 |
| 124 | 39.2 k |
| 126 | 1 k |
| 129 | 5.6 k |
| 131 | 3 M |
| 133 | 2 k |
| 135 | 22 |
| 140 | 422 |
| 142 | 22 k |
| 146 | 1.5 k |
| 149 | 5.6 k |
| 152 | 10 k |
| 154 | 10 k |
| 156 | 10 k |
| 167 | 10 k |
| 171 | 64.7 |
| 172 | 1.3 k |
| 187 | 100 k |
| 188 | 22 |
| 193 | 100 k |
| 195 | 59 k |
| 196 | 59 k |
| 201 | 22 |
| 206 | 15 k |
| 209 | 5.62 k |
| 217 | 22 |
| 225 | 10 k |
| 226 | 10 k |
| 318 | 4.75 k |
| 326 | 100 k |
| 328 | 100 k |
| 330 | 4.75 k |
| 334 | 4.75 k |
| 336 | 4.75 k |
| 356 | 10 k |
| 358 | 47.5 k |
| 360 | 4.75 k |
| 364 | 47.5 k |
| 366 | 4.75 k |
| 370 | 47.5 k |
| 372 | 4.75 k |
| 376 | 47.5 k |
| 378 | 4.75 k |
| 382 | 4.75 k |
| 386 | 4.75 k |
| 390 | 4.75 k |
| 394 | 47.5 k |
| 396 | 47.5 k |
| 398 | 47.5 k |
| 400 | 47.5 k |
| 401 | 220 |
| 402 | 220 |

TABLE I-continued

| | |
|---|---|
| 403 | 220 |
| 405 | 220 |
| 406 | 220 |
| 407 | 220 |
| 408 | 220 |
| 411 | 47.5 k |
| 412 | 47.5 k |
| 413 | 47.5 k |
| 414 | 47.5 k |
| 415 | 47.5 k |
| 416 | 47.5 k |
| 417 | 47.5 k |
| 418 | 47.5 k |
| 420 | 1 k |
| 421 | 1 k |
| 422 | 1 k |

Capacitors

| Element | Value |
|---|---|
| 103 | .1 µF |
| 105 | 150 pF |
| 107 | .1 µF |
| 113 | 22 pF |
| 116 | .1 µF |
| 119 | 1 nF |
| 123 | 1 nF |
| 125 | .1 µF |
| 134 | .1 µF |
| 137 | .1 µF |
| 139 | .1 µF |
| 143 | 12 pF |
| 144 | 1 nF |
| 147 | 1 nF |
| 151 | .1 µF |
| 155 | 47 pF |
| 160 | .1 µF |
| 165 | .1 µF |
| 166 | .1 µF |
| 168 | .1 µF |
| 169 | 47 nF |
| 173 | 47 nF |
| 175 | 47 nF |
| 177 | 47 nF |
| 178 | 47 nF |
| 179 | .1 µF |
| 181 | .1 µF |
| 182 | .1 µF |
| 183 | .1 µF |
| 184 | .1 µF |
| 185 | .1 µF |
| 186 | 2.2 µF |
| 189 | 1 µF |
| 190 | 1 µF |
| 192 | .1 µF |
| 197 | 330 pF |
| 199 | 1 nF |
| 200 | .1 µF |
| 207 | .1 µF |
| 208 | 6.8 µF |
| 210 | 1 µF |
| 222 | .1 µF |
| 223 | .1 µF |
| 224 | .1 µF |
| 314 | 10 µF |
| 315 | .1 µF |
| 316 | .1 µF |
| 317 | .1 µF |
| 322 | 27 pF |
| 324 | 47 pF |
| 342 | 10 µF |
| 344 | 1 µF |
| 346 | .1 µF |
| 352 | .1 µF |
| 354 | 10 µF |
| 424 | .1 µF |

TABLE I-continued

Coils

| Element | Value |
|---|---|
| 170 | 270 µH, Qmin = 30 |
| 176 | 270 µH, Qmin = 30 |

Having described the circuitry for the signal detector of the present invention as diagrammed in FIG. 2 and explained in detail with reference to FIGS. 3(a)–6(b), the operation of the signal detector may now be better appreciated. In this first exemplary embodiment, the signal detector has five distinct modes. For ambient ultrasonic signals detected by first sensor element 14 (microphone), there are two operational modes which may be referred to as "airborne high" and "airborne low". For sonic and ultrasonic signals detected by second sensor element 16 (contact probe) there are three distinct operational modes which may be referred to as "probe high", "probe low" and "probe sonic" when selecting "airborne high", the range of signals detected are 36 kHz to 44 kHz. When selecting "airborne low", the range is 26 kHz to 34 kHz. When selecting "probe high", this range is 36 kHz to 44 kHz. When selecting "probe low" the range is 16 kHz to 24 kHz, and when selecting "probe sonic" this range is 0 kHz to 15 kHz.

The signal detector is turned on and off by activating push button switch 24. When initially turned on microcontroller 302 communicates information to chip 308 whose alphanumeric display 20 displays the last mode used before power was turned off. Then, depressing either of push buttons 28 or 30 causes microcontroller to communicate information to chip 308 so that the previous sensitivity level for the most recent mode is displayed in alphanumeric display 20. This sensitivity level can then be adjusted either up or down between the range of 0 to 255, inclusively, by depressing switches 28 or 30. Alternatively, once power is turned on and the most recent mode of operation is displayed, the mode button 26 can be depressed to display the most recent volume level used at that mode. Thereafter, pressing either push buttons 28 or 30 will adjust the volume to a new level between the range of 0–255, inclusively, and this information is also stored in the microcontroller's memory. The mode button can be depressed to toggle through the various modes of operation noted above until a desired mode is reached. For purposes of example only, and where high ultrasonic signals sensed by sensor 16 (contact probe) are of interest, mode button 26 can be depressed until "probe high" appears on alphanumeric display 20. The sensitivity setting for that particular mode can then be adjusted up or down by depressing either of buttons 28 or 30. Pushing mode button 26 again then displays the volume setting which may be adjusted either up or down by pushing either of buttons 28 or 30. The type of information displayed in alphanumeric display 20 can also be selectively controlled. For example, mode button 26 can be depressed until "Disp" appears on alphanumeric display. Thereafter, pushing either of buttons 28 or 30 toggles the display mode between "off", "continuous", and "peak hold". In the "peak hold" setting, the alphanumeric display and holds the highest number and then updates this information. The LED bar graph is always on in continuous and "peak hold" status. The alphanumeric tracks numerically the level of the LED bar graph.

All user selections and settings remain in the memory of the microcontroller indefinitely as long as the battery is installed, even if the signal detector is turned off by depressing push button 24. When the battery is removed or becomes depleted, all user settings are lost and the instrument reverts to a predefined state. All parameters, such as, but not limited to, tuning, configuration of switches, range of the settings, speed of response and information displayed, can be infinitely modified by the software written in the program memory of the microcontroller thus affecting changes in the feel and function of this instrument.

A preferred construction for the second sensor element 16 for use with the signal detector of the present invention may be appreciated now with reference to FIGS. 7(a), 7(b) and B. As stated hereinabove, the function of second sensor element 16 is to convert mechanical sound waves in solids to an electrical signal. This electrical signal can then be analyzed to provide information on conditions that are hidden from view or are impossible to see. Low frequency signals can be amplified and then heard and their amplitude measured. High frequency signals can be frequency shifted or simply viewed with analyzers or other instruments that have the required band width. Second sensor element 16 can be used in any device that needs to convert sounds in solids to an electrical signal.

Preferably, each of first sensor element 14 and second sensor element 16 are supported on a sensor horn 500 which is mounted to the signal detector's housing 12. Second sensor element 16 includes a piezoelectric crystal 130 (FIG. 3(b)) made from PZT (lead zirconium titanate). Preferably, crystal 130 is cylindrical in shape with its thickness being two-thirds of its diameter. The natural frequency of crystal 130 is a function of its chemical composition, diameter and thickness. This type of cylindrical element has a broad frequency response that allows it to be used in frequencies under its resonance, down to audio frequencies. The actual overall resonance of the crystal depends on the way it is mounted in its housing 504, the way the housing 504 is attached to the instrument and the way the second sensor element's touch probe portion 11 is attached to the instrument.

The operating mode of piezoelectric crystal 130 is longitudinal. Sound in a solid, such as a bearing, is transported through rod 11 to vibration sensor housing 504. In vibration sensor housing 504, the sound is mostly longitudinal, i.e. it travels in the direction of oscillation. This oscillation forces crystal 130 to compress and to elongate along its longitudinal axis "L". This stress generates a voltage across the end faces 506 and 508 of crystal 130. This voltage is picked off using metalized electrodes on the surfaces of crystal 130. One electrode maybe the vibration sensor housing itself which completely envelopes crystal 130 to shield it from airborne sounds and from electromagnetic noise. Crystal 130 is mounted within vibration sensor housing 504 through the use of a conductive epoxy 510. Vibration sensor housing 504 is preferably made with a locating step that center crystal 130 therein. This assures that the crystal's outer sidewall 507 will not contact the inside of a vibration sensor housing 504 causing crystal 130 to restrict its movement or to be electrically shorted. Either of these problems will cause reduced output of the sensor assembly.

The crystal's second electrode 512 is connected to a circular circuit board 514 that contains the pre-amplifier (resister 131, JFET 132 and resistor 133) discussed herein above with reference to FIG. 3(b). Circuit board 514 is sized and adapted to be supported on a ledge 516 formed within vibration sensor housing 504. An end cap 516 is also adapted to threadedly engage vibration sensor housing 504 so that piezoelectric crystal 130 and circuit board 514 are locked into place. The second electrode 512 which connects the free end of piezoelectric crystal 130 to circuit board 514 is preferably a multi-strand superflex type of wire that allows crystal 130 to move without giving it a lot of resistance. Finally, end cap 518 includes a central aperture 519 to provide access to the wires 520 that bring power in and carry the second electronic signal out to the processing circuitry.

FIGS. 9(a) and 9(b) show a preferred mounting of the analog circuit board to the digital circuit board to permit data to be communicated therebetween. Lower analog circuit board 604 has the various circuitry components 606 mounted thereon, of which includes first connector 210 provided with a plurality of ports 608 (14 total). Upper digital board 600 likewise has the various digital circuitry components 602 mounted thereon of which includes second connector 310 having a plurality of rigid and L-shaped connector pins (14 total) which are sized and adapted to be received in cooperative ones of ports 608, as best shown in FIG. 9(b). With this type of connection between upper digital board 600 and lower analog board 604 interference between the boards is reduced. Also, because all of the digital processing circuitry described above with reference to FIG. 6(a) and 6(b) are contained on a single board and because microcontroller 302 can be appropriately loaded with software in its memory to accommodate various user parameters, digital board 600 and analog board 604 are readily interchangeable as desired. This increases the overall versatility of the signal detector of the present invention. It should be appreciated, of course, that this type of interconnection between the signal detector's digital board 600 and analog board 604 can be used for any of the exemplary embodiments of the invention described herein, as well as any other device using a housing in the form of a Serco Mold slide and lock instrument case.

Figure 10:
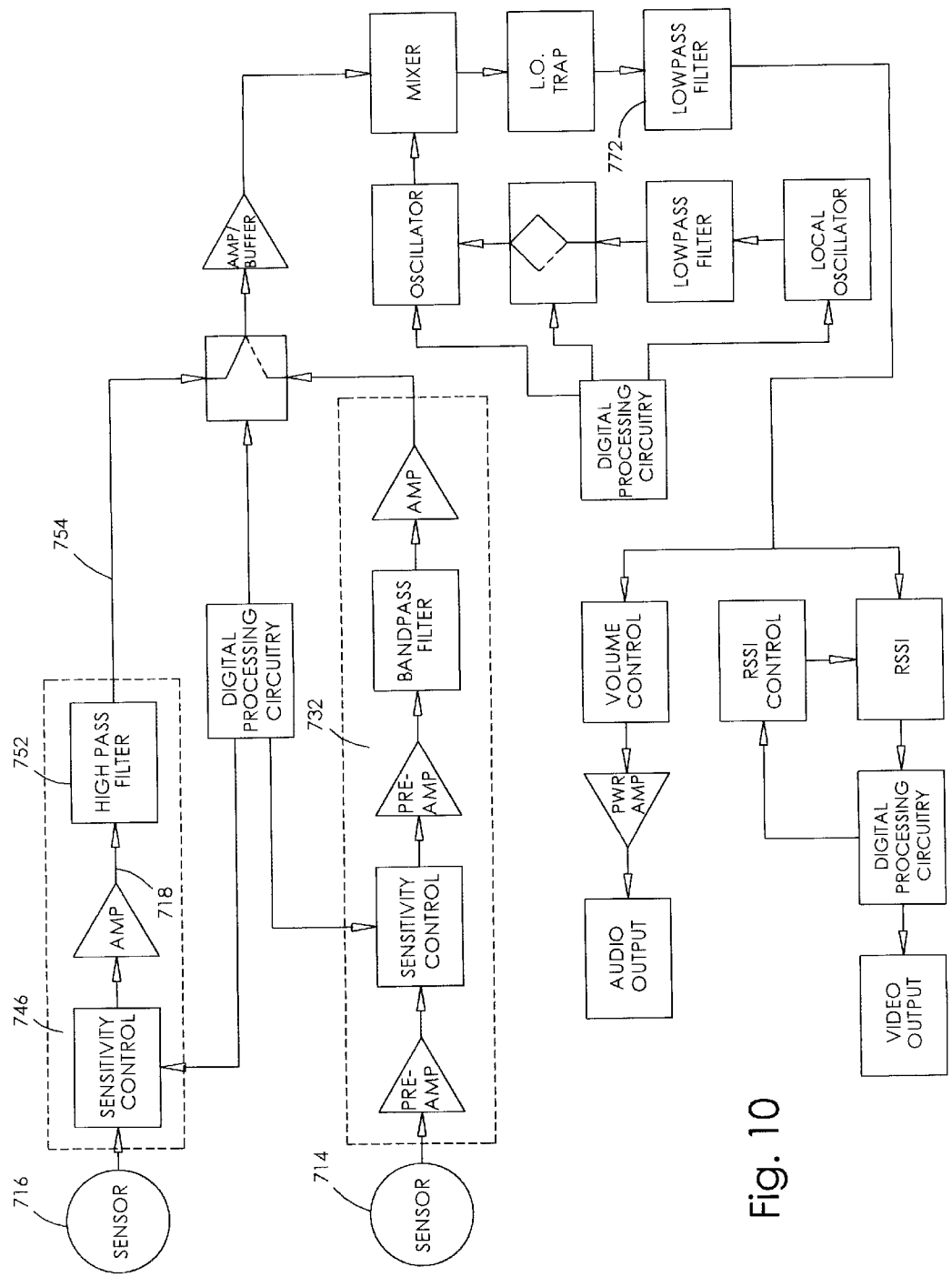
FIG. 10 is a block diagram showing the principal features of the signal detector circuitry according to a second exemplary embodiment of the present invention.

With the foregoing in mind, a second exemplary embodiment of the signal detector of the present invention is diagrammed in FIG. 10. The principal features of this circuitry that form signal detector 710 are similar to those of signal detector 10 discussed above with reference to the first exemplary embodiment of the present invention. That is, signal detector 710 includes a first sensor element 714 having an associated amplification and filter circuitry 732 and a second sensor element 716 with an associated amplification and filter circuitry 746. First sensor element 714 and its amplification and filter circuitry 732 are constructed identically as described herein above.

The amplification and filter circuitry 746 associated with second sensor element 716, however, is different in that it only passes ultrasonic signals for subsequent processing. That is, it may be seen that the amplified second electrical signal 718 here is not split into first and second components thereof, but is rather presented directly to high pass filter 752 to generate second input signal 754. This signal detector is, therefore, used only to monitor ultrasonic signals in either an ambient environment or a solid to audibly and visually display the strength of these signals. As such, there is no need for an additional switch located at the output of low pass filter 772. The ordinarily skilled artisan should readily appreciate that the circuitry described above with reference to the signal detector 10 of the first exemplary embodiment of the present invention can be easily modified to arrive at the circuitry diagrammed in FIG. 10 by merely retaining switch 74 (FIGS. 2 and 3(a)) in the first switch condition whereby it 1only passes signals from the heterodyning section to an appropriate output device.

Figure 11:
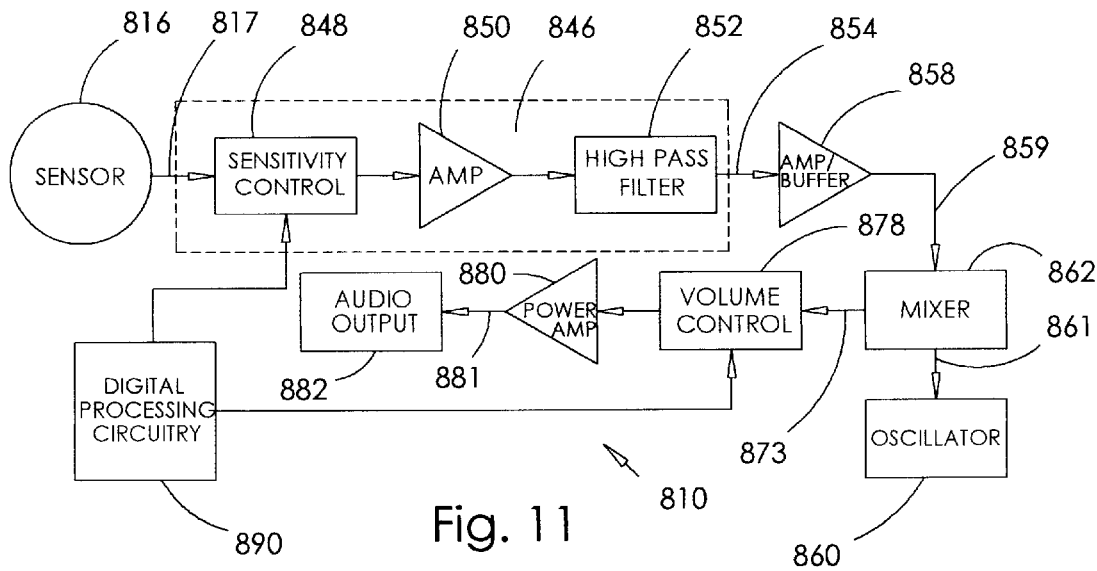
FIG. 11 is a block diagram showing the principal features of the signal detector circuitry according to a third exemplary embodiment of the present invention.

A third exemplary embodiment of the signal detector of the present invention is diagrammed in FIG. 11. This third exemplary embodiment illustrates a more basic construction for a signal detector 810 which still incorporates a digital processing circuitry 890 operative to independently control sensitivity and volume adjustments. Here, a sensor element 816 is operative in response to the presence of sound signals to produce an electrical signal 817. Amplification and filter circuitry 846 processes this electrical signal 817 to remove all frequency components thereof not within a selected frequency range and to produce an input signal 854 at a selected input signal frequency and input signal amplitude. Amplification filter circuitry 846 has a sensitivity control circuit 848 associated therewith and also includes an amplifier 850 and a high pass filter 852.

Electrical signal 854 may be presented to amplifier/buffer 858 to produce an amplified input signal 859 which is presented to a mixer 862. Mixer 862 also receives a reference signal 861 from oscillator 860 to generate a mixed composite signal that has passed through a local oscillator trap and a low pass filter (not shown) to produce an output signal 873 which is then presented to volume control circuit 878.

As discussed above with reference to the first exemplary embodiment of the present invention, volume control circuit 878 and sensitivity control circuit 848 may be independently adjustable by digital processing circuitry 890 to increase the versatility of signal detector 810. Output signal 873 is then presented to a power amplifier 880 to produce an amplified output signal 881 which may be audibly displayed by an audio output device 882. It should be readily appreciated by the ordinarily skilled artisan that sensor 816 and its associated amplification and filter circuitry 846 may be in the form of either a microphonic device or a touch probe as discussed above in reference to the first exemplary embodiment of the present invention.

Figure 12:
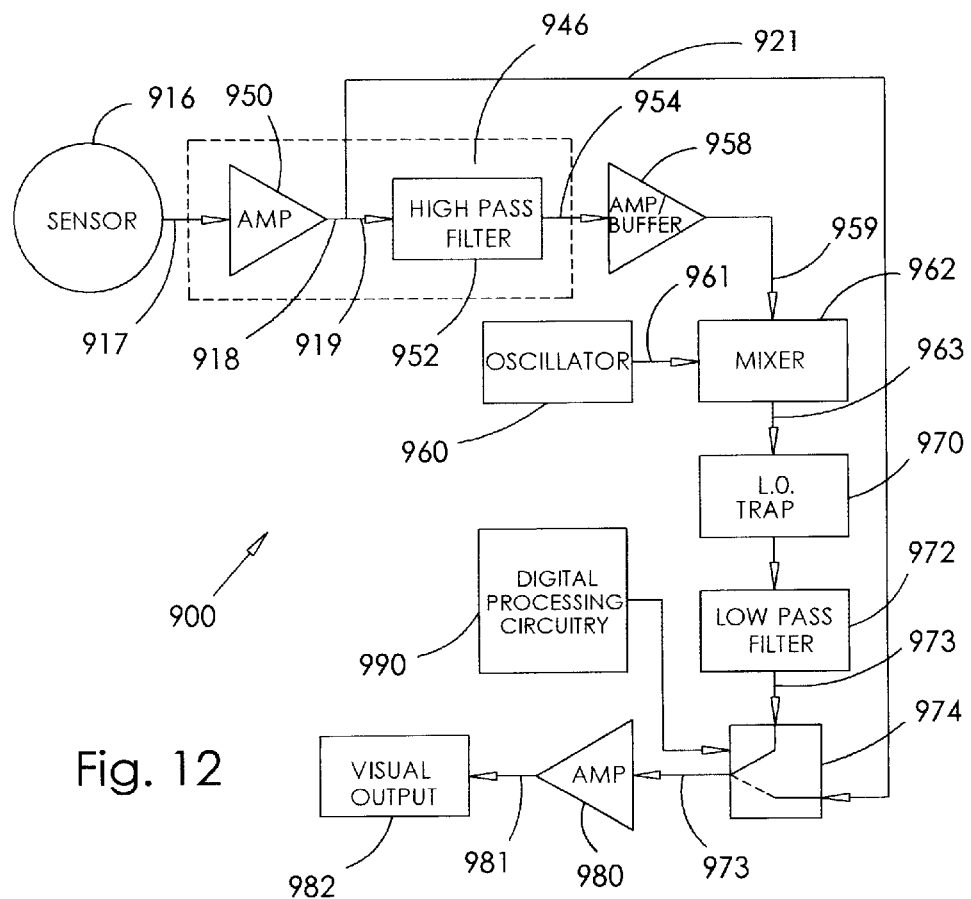
FIG. 12 is a block diagram showing the principal features of the signal detector circuitry according the a fourth exemplary embodiment of the present invention.

A fourth exemplary embodiment of the present invention is shown in FIG. 12. This fourth embodiment is directed to a signal detector 900 which also incorporates a single sensor 916, preferably a contact probe, for the detection and monitoring of both sonic and ultrasonic signals. To this end, sensor 916 generates an electrical signal 917 which is presented to amplification and filter circuitry 946 including amplifier 950 and high pass filter 952. The amplified electrical signal 918 is split into first and second components thereof. First component 919 passes through high pass filter 952 to produce input signal 954. Input signal 954 then is presented to amplifier/buffer 958 to produce an amplified input signal 959. Mixer 962 receives this amplified input signal 959 and a reference signal 961 from oscillator 960 to produce a mixed composite signal 963. Mixed composite signal 963 then passes through local oscillator trap 970 and low pass filter 972 to produce output signal 973.

The second component 921 of the electrical signal 918 bypasses high pass filter 952 and is therefore at a sonic frequency. This second component 921, along with output signal 973, which has ultrasonic characteristics, are presented to a switch 972 controlled by digital processing circuitry 990. A selected one 973 of these two signals passes through an amplifier 980 to produce an amplified output signal 981 that is then presented to an appropriate output device 982 which may be either an audio or visual display. With respect to the second, third and fourth exemplary embodiments of the present invention diagrammed in FIGS. 10–12, the ordinarily skilled artisan should readily appreciate that various other components from the circuitry described with reference to the first exemplary embodiment of the present invention can be incorporated as desired to tailor the signal detector to one's particular needs.

With an understanding of the foregoing description, it should be appreciated that the present invention also provides a method for monitoring sound signals in order to indicate a presence of those signals having frequencies within a selected range.

Broadly, this method comprises the steps of: (1) providing a first sensor element of a first type operative to receive sound signals emanating from a first medium and to generate a first electrical signal in response thereto; (2) providing a second sensor element of a second type different from the first type, with the second sensor element operative to receive sound signals emanating from a second medium and to generate a second electrical signal in response thereto; (3) selecting one of the first and second electrical signals for processing; (4) processing the selected one of the first and second electrical signals to generate at least a first output signal at a selected first output signal frequency and first output signal amplitude; and (5) displaying first output signal.

The processing step may also include the steps of amplifying the selected one of the first and second electrical signals and thereafter filtering the selected one of these signals to remove all frequency components thereof that do not have a frequency within a selected range, thereby to produce an input signal at a selected input signal frequency and input signal amplitude. A step of mixing the input signal with a reference signal to produce a mixed composite signal at a composite signal frequency and composite signal amplitude may also be done. Thereafter, the mixed composite signal may be filtered to produce the first output signal. If desired, the mixed composite signal may be split into first and second components thereof whereby the first component is processed to generate the first output signal for audible display and the second component is processed to generate a second output signal that is visually displayed. In addition, a step of splitting the selected one of the first and second electrical signals into first and second components thereof may also be included. The steps of selecting one of the first and second electrical signals and selecting one of the first and second components of the mixed composite signal may each be accomplished by actuating an appropriate electrical switch.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A signal detector for monitoring sound signals having frequencies within selected ranges and for producing at least a first output signal in response thereto, comprising:

(a) a first sensor element of a first type operative in response to presence of the sound signals to produce a first electrical signal;

(b) first amplification and filter circuitry operative to receive the first electrical signal to remove all frequency components thereof not within a first selected range and to produce a first input signal at a selected first input signal frequency and first input signal amplitude;

(c) a second sensor element of a second type different from the first type, said second sensor element operative in response to presence of the sound signals to produce a second electrical signal;

(d) second amplification and filter circuitry operative to receive the second electrical signal to remove all frequency components thereof not within a second selected range and to produce a second input signal at a selected second input signal frequency and second input signal amplitude;

(e) an oscillator circuit operative to produce a reference signal at a selected reference signal frequency;

(f) a mixer operative to receive the reference signal and a selected one of said first and second input signals to produce a mixed composite signal at a mixed composite signal frequency and at a mixed composite signal amplitude;

(g) a first switch operative in a first switch condition to selectively interconnect said mixer to said first input signal and operative in a second switch condition to selectively interconnect said mixer to said second input signal;

(h) a first amplifier operative to amplify the mixed composite signal to produce a first output signal; and (i) a first output device for producing a display in response to said first output signal.

2. A signal detector according to claim 1 wherein said mixed composite signal is split into first and second components thereof, said first amplifier operative to amplify the first component of said mixed composite signal to produce said first output signal, and including a second amplifier operative to amplify the second component of said mixed composite signal to produce a second output signal.

3. A signal detector according to claim 2 including a received signal strength indicator (RSSI) circuit operative to monitor said second amplifier to produce a signal strength indicator signal that is correlated to the selected one of said first and second input signals, said RSSI circuit being selectively adjustable.

4. A signal detector according to claim 3 including a visual display for producing visible output in response to said signal strength indicator signal whereby said visible output indicates the strength of the second component of said mixed composite signal.

5. A signal detector according to claim 1 wherein said first amplification and filter circuitry includes a band pass filter having a frequency band centered at a first target ultrasonic frequency which is in a range of 36 kHz to 44 kHz.

6. A signal detector according to claim 1 wherein said first amplification and filter circuitry includes an associated first sensitivity control circuit operative in response to the first electrical signal to remove all components thereof above a first selected amplitude range and wherein said second amplification and filter circuitry includes an associated second sensitivity control circuit operative in response to the second electrical signal to remove all components thereof above a second selected amplitude range.

7. A signal detector according to claim 6 wherein said first output device is an audio output device operative to produce an audio sound in response to said first output signal and including a volume control circuit operative to selectively vary amplitude of said first output signal, said volume control circuit being independently adjustable of said first and second sensitivity control circuits.

8. A signal detector according to claim 7 including a digital processing circuit operative to independently adjust said volume control circuit and said first and second sensitivity control circuits.

9. A signal detector according to claim 1 including a digital processing circuit operative to selectively vary the reference frequency of said oscillator.

10. A signal detector according to claim 1 wherein said second amplification and filter circuitry includes at least one pre-amplifier operative to amplify said second electrical signal and a high pass filter operative to remove low frequency signals from said second electrical signal and wherein said second electrical signal is split into first and second components thereof between said pre-amplifier and said high pass filter, wherein the first component of said second electrical signal is at a sonic frequency and the second component of said second electrical signal is at an ultrasonic frequency, said first switch operative in the first condition to interconnect the mixer to the first component of said second electrical signal.

11. A signal detector according to claim 10 including a second switch operative in a first switch condition to interconnect to said mixed composite signal and operative in a second switch condition to interconnect to the second component of said second electrical signal.

12. A signal detector according to claim 11 including a digital processing circuit operative to control the conditions of said first and second switches.

13. A signal detector according to claim 1 wherein said first sensor element is an ultrasonic microphone device and wherein said second sensor element is contact probe.

14. A signal detector according to claim 1 wherein said first and second sensor elements are mounted to a common housing.

15. A signal detector for monitoring sound signals having frequencies over a selected frequency range and for producing an audible signal in response thereto, comprising:

(a) a sensor element operative in response to presence of sound signals to produce an electrical signal;

(b) a sensitivity control circuit operative in response to the electrical signal to remove all components thereof above a selected amplitude range;

(c) amplification and filter circuitry operative in response to the electrical signal to remove all frequency components thereof not within the selected frequency range and to produce an input signal at a selected input signal frequency and input signal amplitude;

(d) an oscillator operative to produce a reference signal at a selected reference signal frequency;

(e) a mixer operative to receive the input signal and the reference signal to produce a mixed composite signal at a selected composite signal frequency and at a composite signal amplitude corresponding to the input signal amplitude;

(f) a volume control circuit operative to selectively vary said composite signal amplitude, said sensitivity control circuit and said volume control circuit being independently adjustable;

(g) an amplifier operative to amplify the mixed composite signal to produce an audio signal; and (h) an audio output device for producing an audio sound in response to said audio signal.

16. A signal detector for monitoring sound signals having frequencies over a selected frequency range and for producing an audible signal in response thereto, comprising:

(a) a sensor element operative in response to presence of sound signals to produce an electrical signal;

(b) a first amplifier operative to amplify the electrical signal to produce an amplified electrical signal, said amplified electrical signal thereafter being split into first and second components thereof;

(c) a filter operative to receive the first component of said electrical signal to remove all frequency components thereof not within the selected frequency range and to produce an input signal at a selected input signal frequency and input signal amplitude;

(d) an oscillator operative to produce a reference signal at a selected reference signal frequency;

(e) a mixer operative to receive the input signal and the reference signal to produce a mixed composite signal at a selected composite signal frequency and at a composite signal amplitude corresponding to the input signal amplitude;

(f) a switch operative in a first switch condition to receive said composite signal and operative in a second switch condition to receive said amplified electrical signal;

(g) a second amplifier operative to amplify a selected one of said composite signal and said amplified electrical signal to produce an output signal; and (h) an output device for producing a display in response to said output signal.

17. A method for monitoring sound signals in order to indicate a presence of those signals having frequencies within a selected range, comprising the steps of:

(a) providing a first sensor element of a first type operative to receive sound signals emanating from a first medium and to generate a first electrical signal in response thereto;

(b) providing a second sensor element of a second type different from the first type, said second sensor element operative to receive sound signals emanating from a second medium and to generate a second electrical signal in response thereto;

(c) selecting one of said first and second electrical signals for processing;

(d) processing the selected one of said first and second electrical signals to generate at least a first output signal at a selected first output signal frequency and first output signal amplitude; and (e) displaying said first output signal.

18. A method according to claim 17 wherein said processing step includes the steps of amplifying the selected one of said first and second electrical signals and thereafter filtering the selected one of said first and second electrical signals to remove all frequency components thereof which do not have a frequency within a selected range, thereby to produce an input signal at a selected input signal frequency and input signal amplitude.

19. A method according to claim 18 including the step of mixing said input signal with a reference signal to produce a mixed composite signal at a composite signal frequency and composite signal amplitude.

20. A method according to claim 19 including the step of filtering said mixed composite signal to produce said first output signal.

21. A method according to claim 17 wherein the step of selecting one of said first and second electrical signals is accomplished by actuating an electrical switch.

22. A method according to claim 17 including the step of splitting said mixed composite signal into first and second components thereof.

23. A method according to claim 22 including the steps of processing the first component of said mixed composite signal to generate the first output signal and audibly displaying said first output signal.

24. A method according to claim 23 including the steps of processing the second component of said mixed composite signal to generate a second output signal and visually displaying said second output signal.

25. A method according to claim 17 including the step of splitting the selected one of said first and second electrical signals into first and second components thereof.

26. A method according to claim 17 including the step of accessing a selected one of said first and second components for display.

27. A method according to claim 26 the step of accessing the selected one of said first and second components is accomplished by actuating an electrical switch.

* * * * *